(12) United States Patent
Lindal

(10) Patent No.: US 6,460,583 B1
(45) Date of Patent: Oct. 8, 2002

(54) METHOD OF FORMING A WATERTIGHT PLANK SECTION BY INTERLOCKING GREEN TONGUE PLANKS WITH GREEN GROOVE PLANKS, SECURING CROSS TIES OR BATTENS INTO CROSS GROOVES, AND DRYING THE SECTION

(76) Inventor: Sir Walter Lindal, 1120 8th Ave. #2201, Seattle, WA (US) 98101

( * ) Notice: Subject to any disclaimer, the term of this patent is extended or adjusted under 35 U.S.C. 154(b) by 0 days.

(21) Appl. No.: 09/660,229

(22) Filed: Sep. 12, 2000

Related U.S. Application Data

(63) Continuation-in-part of application No. 09/259,627, filed on Feb. 26, 1999, now abandoned.

(51) Int. Cl.⁷ .................................................. B27F 1/00
(52) U.S. Cl. ..................... 144/347; 52/748.1; 52/233
(58) Field of Search ............................... 52/233, 748.1, 52/284, 286, 586.1; 144/347, 346, 345

(56) References Cited

U.S. PATENT DOCUMENTS

| 3,863,409 A | * | 2/1975 | Fell ............................. 52/233 |
| 4,443,990 A | * | 4/1984 | Johnson ...................... 52/514 |
| 5,020,289 A | * | 6/1991 | Wrightman .................. 52/233 |
| 5,400,845 A | * | 3/1995 | Choiniere et al. .......... 144/353 |

* cited by examiner

*Primary Examiner*—Carl D. Friedman
*Assistant Examiner*—Naoko Slack
(74) *Attorney, Agent, or Firm*—Jensen & Puntigam, PS

(57) ABSTRACT

A method of forming a watertight plank section including sawing green planks and securing a plurality of these planks in such a way that when dried, the planks shrink together in a fashion that forms a watertight seal.

3 Claims, 22 Drawing Sheets

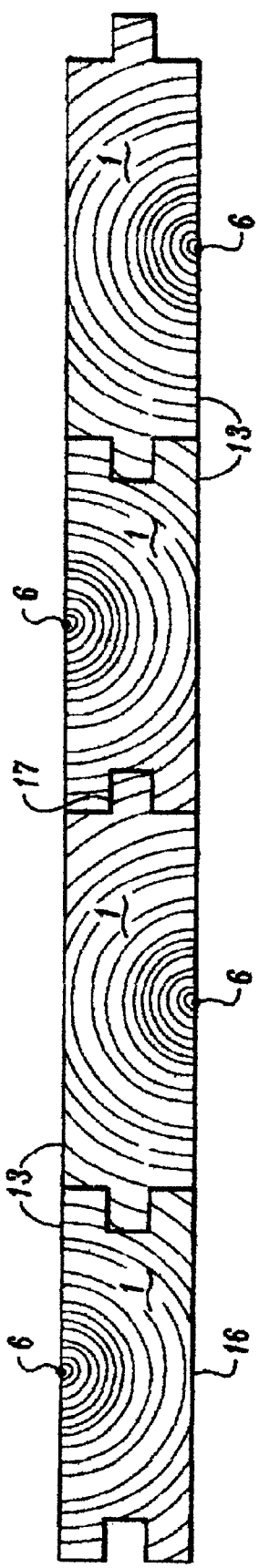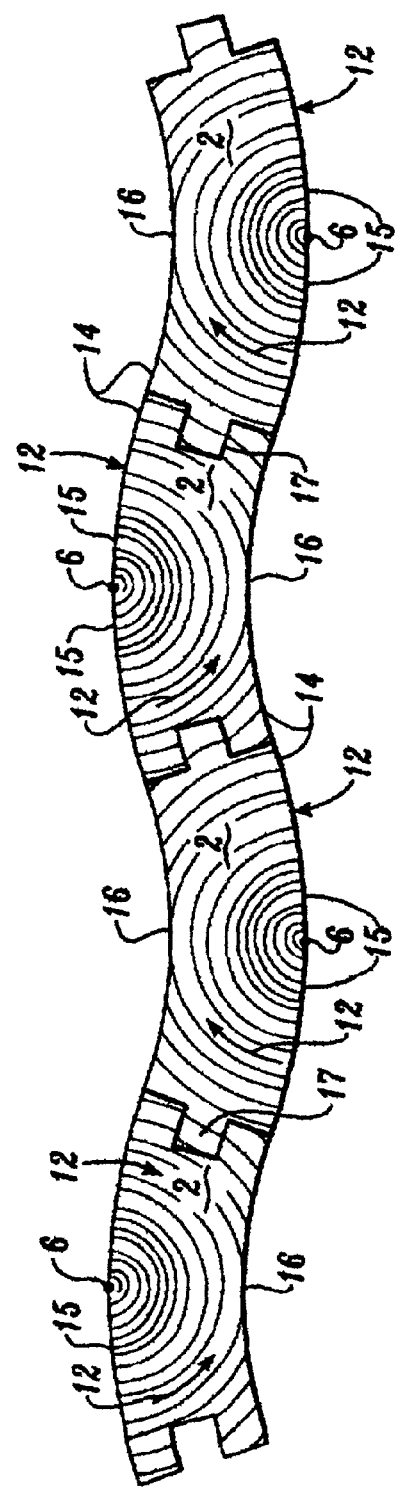

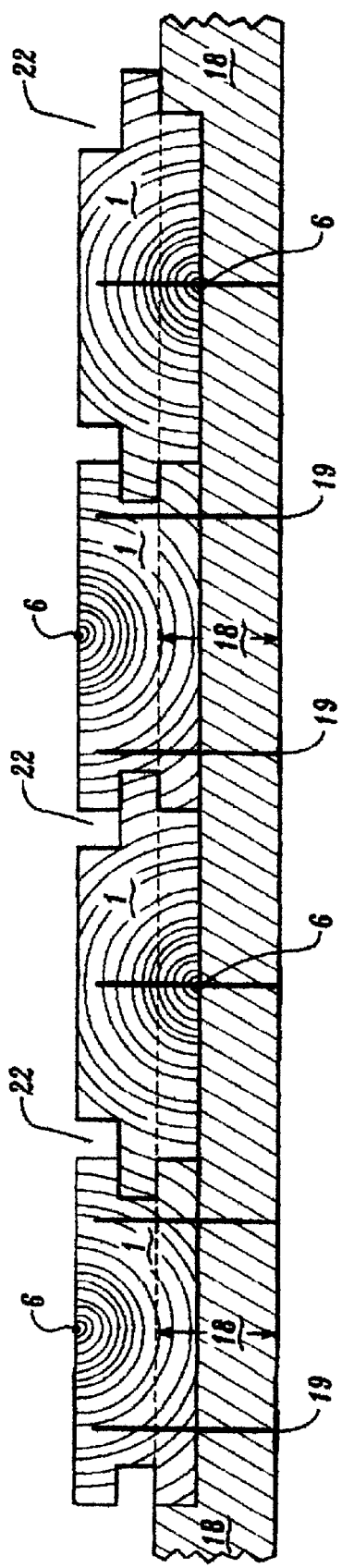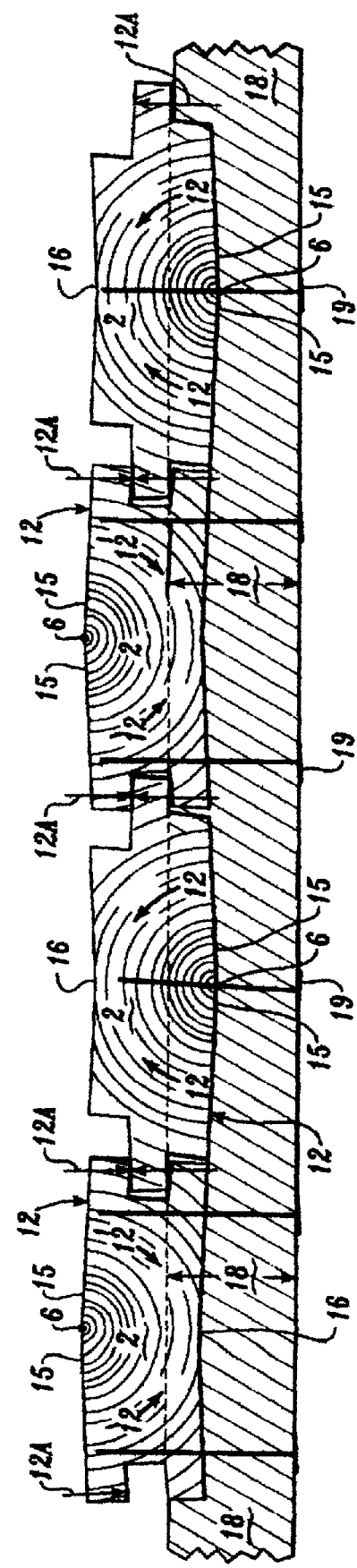

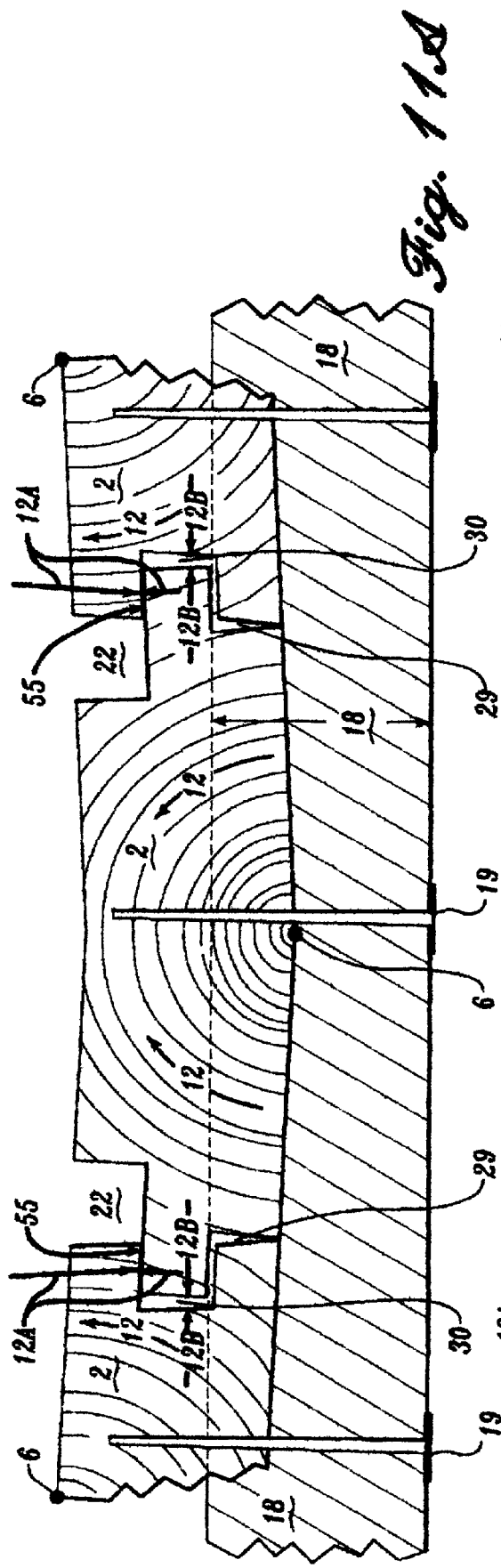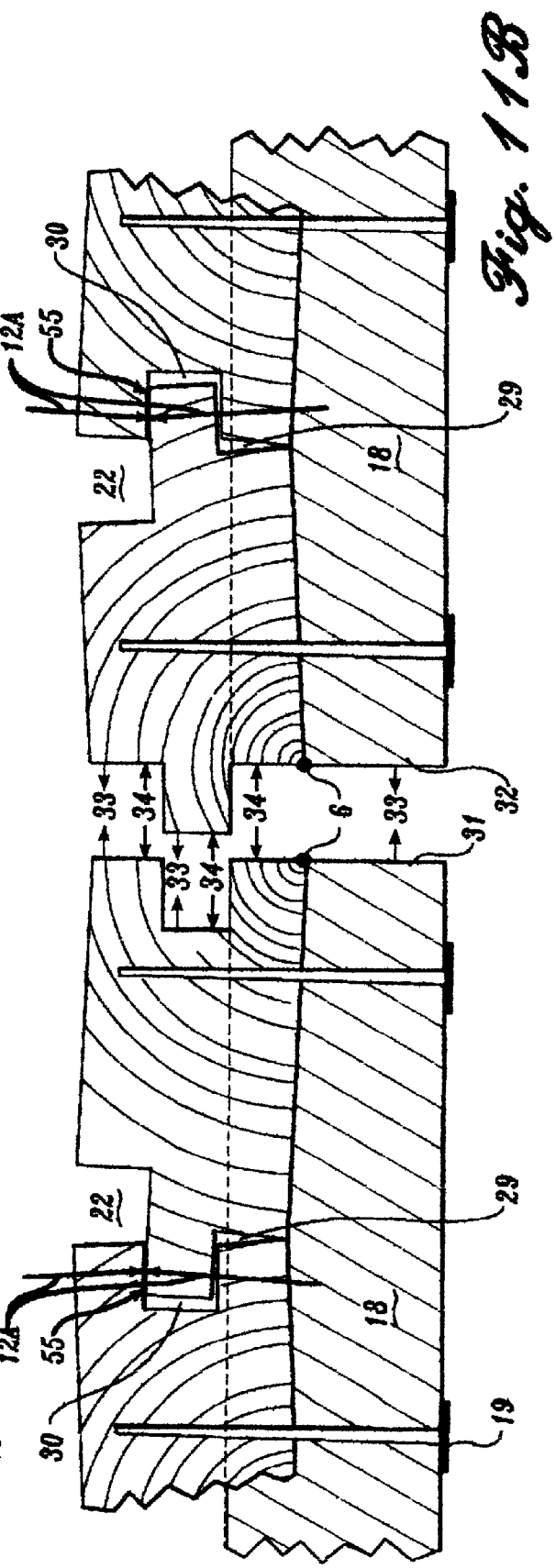

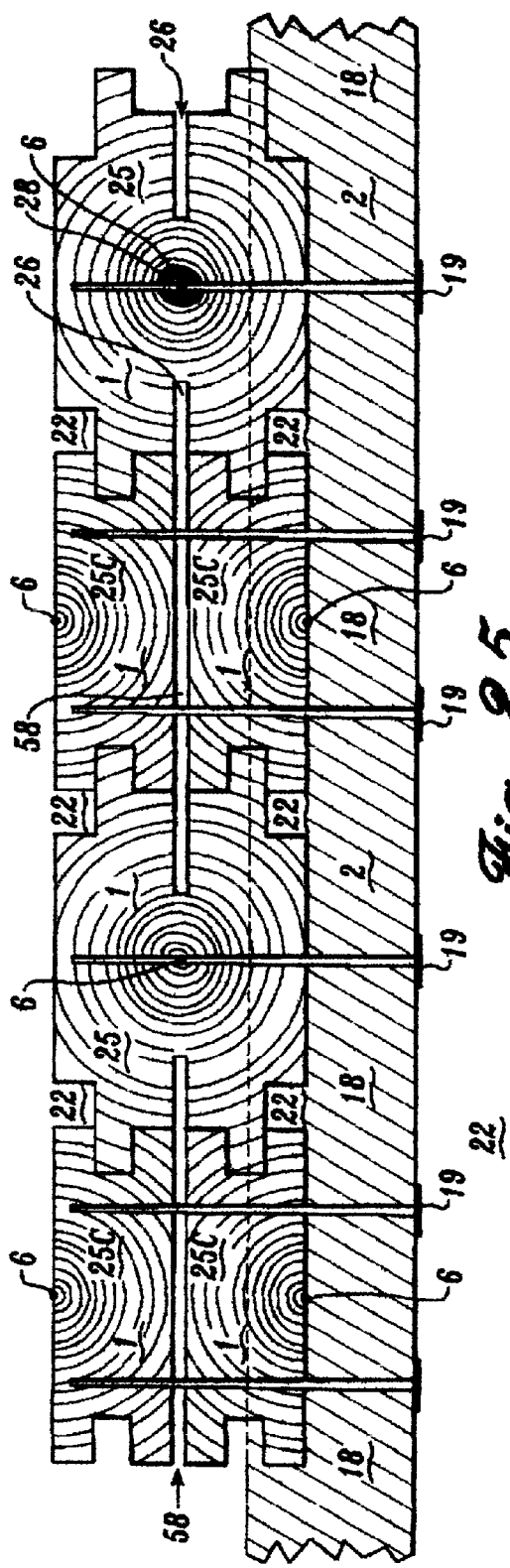
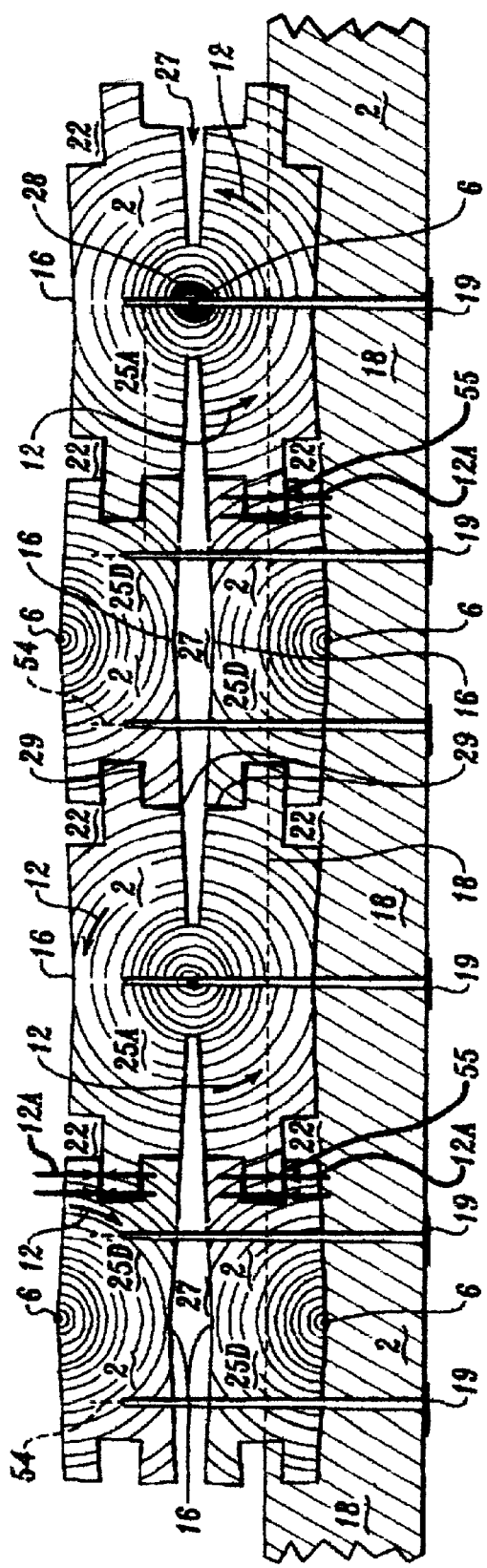

METHOD OF FORMING A WATERTIGHT PLANK SECTION BY INTERLOCKING GREEN TONGUE PLANKS WITH GREEN GROOVE PLANKS, SECURING CROSS TIES OR BATTENS INTO CROSS GROOVES, AND DRYING THE SECTION

CROSS REFERENCES TO RELATED APPLICATIONS

This application is a C-I-P of Ser. No. 09/259,627 filed Feb. 26, 1999 abandoned.

My patent application Ser. No. 08/640,181 filed Apr. 30, 1996 contained a broad application including various building panels that have waterproof joints where silicone caulking was projected. This application was divided into three divisions and was abandoned. Division I of '181 was filed Sep. 28, 1998 and covers waterproof planks and waterproof panels of multiple planks that called for waterproof joints between the planks and between the panels without specifically stating how the waterproof joints were designed. This application follows many years of experimenting to solve the problem of waterproof joints including individual joints between planks in a panel and also a means to provide waterproof joints between panels.

In January 1978 I received a patent for metal covered planks and metal covered panels having multiple planks that had an effective waterproof folding sheet metal joint system. LINDAL U.S. Pat. No. 4,065,902.

In August 1978 I received U.S. Pat. No. 4,107,885 LINDAL, which covered single planks and multiple plank panels covered with wood shingles that had a waterproof joint system that called for a layer of shingles set in a waterproof configuration for single planks and multiple plank panels.

On Sep. 28, 1998 I made a divisional patent application from Ser. No. 08/640,181, which received the Ser. No. 09/185,964. This application is still under prosecution and covers planks that are waterproof and which encase the heart of the log they were sawn from. Furthermore, waterproof joints between planks was assumed as silicone, as disclosed in Ser. No. 08/640,181, and did a good job of waterproofing joints.

On Feb. 26, 1999 I applied for a patent, application Ser. No. 09/259,627, for a waterproof joint system where the planks in the panels had the hearts of the logs, the planks were made from all on one side of the panels. As explained later, the planks were green and in the drying process cupped askewing the tongues in the grooves making tighter more waterproof joints. Further experimenting proved that, if the planks were fixed in the panels so that the heart side of each plank alternated from one side of the panel to the other, the cupping action forced the whole side of the tongues against the whole side of the grooves instead of just the corners of the "askew" tongues when the hearts were all on one side of the panel. This is a much improved joint system. I tried to enter this improvement in my first response to this application (Ser. No. 09/259,627), but decided that this would not pass as it really is new art and am now making a C.I.P. application (continuation in part) and my application Ser. No. 09/259,627 is now considered abandoned. I am enclosing the fee that would be necessary if this was a new patent application and I am asking for the dating to be the date this C.I.P. application is entered into the patent office.

STATEMENT REGARDING FEDERALLY SPONSORED RESEARCH OR DEVELOPMENT

Not Applicable.

REFERENCE TO A "MICROFICHE APPENDIX"

Not Applicable

BACKGROUND OF THE INVENTION

1. Field of the Invention

Prefabricated building panels built out of wood planks and logs whose tongue and groove wood components are almost free of splits and checks and whose joints between the components are so tight that they are waterproof.

2. Description of Related Art

I made a wide search and had a Washington, D.C. professional search the records for any patents granted that would anticipate my invention. Nothing close to my invention was found and I reported none in my initial application Ser. No. 09/259,627—Feb. 26, 1999. However, the examiner in his first action on this application listed and discussed several previously granted patents that had teaching in the field of my invention. I am now responding on each of these inventions in respect to the examiner's discussions. But none of this art refers to using tangential shrinkage in wood to tighten joints between wood planks.

2a. Johnson U.S. Pat. No. 4,443,990, Apr. 24, 1984. By making shrinkage relief saw slits on each side of logs and close to being in line with the heart, Johnson teaches as I have done a means to avoid almost all chances of splits or checks forming from shrinkage known as tangential shrinkage. As this is a practice widely used in the art, I made no claim for invention here. However, Johnson does not refer to tangential shrinkage being used to seal joints between other logs, in fact a second or additional logs or planks are not mentioned.

2b. Choiniere et al, U.S. Pat. No. 5,400,845, Mar. 28, 1995. The inventors here teach a fastener that ties logs together that is unique and is now used widely in the field by log home builders who, like myself, buy these special screws from the assignee of this patent. However, these screws are not used in a manner so that setting is hindered, in fact, the use of a lubricant to aid settling is taught. If the screws extended to the 80% point in the thickness of the lower logs there would be a better chance that the threads of the screws would be locked into a fixed position in the lower logs as these logs shrink from radial shrinkage. Also, if the head of the screws were set tightly to the logs above the screw heads and the screw heads were wider, settling of the logs would be hindered as these screw heads would literally "hang up" the logs above them. Then, my main claim of tightened joints between logs from tangential shrinkage is not even addressed.

2c. Fell, U.S. Pat. No. 3,863,409, Feb. 4, 1975. Fell presents a joint sealing means that puts the weight of the log on two parallel pointed tongues extending along each side of the undersides of the logs. Also, the added weight of the logs above will tend to crush the points or crush the points into the surface of the logs below. The pointed tongues would work better, but all log houses use the weight of the log plus the weight of the logs above to seal joints between the logs. However, this does not always work, the surface of the logs are covered with knots or cut off branches. These knots or branches do not shrink lengthwise as the logs shrink radially and branches between logs pop out and actually hang the logs up creating spaces on each side of the knots through which the wind whistles into the house. My sealing system differs entirely. Elongated tongue and grooves join the tiers of logs together. Tangential shrinkage forces the tongue of the lower log and the side of the groove of the upper log tightly (almost to the point of crushing the wood) together. Because my logs are hung up on the screw heads, they do not settle, but each log individually shrinks slightly radially but not enough to pull the tongues out of the grooves so my wall remains airtight. Some of the radial shrinkage will be recovered as the logs swell more radially in wet weather, so inclement weather makes my wall airtight. My invention works on entirely different principals and is not anticipated by the Fell invention.

2d. Wrightman U.S. Pat. No. 5,020,289, Jun. 4, 1991. Here a log wall is sealed against air or water infiltration between logs using a form of weather stripping that can be compressed 50% and recover. It has secondary seals referred to as a caulk, which can stand 25% compression. This is not a wood crushing against wood seal and though it is excellent and advanced log house art, it does not anticipate my invention.

2e. Peter Sing U.S. Pat. No. 5,485,794, Jan. 23, 1996. I personally know Mr. Sing and appreciate his continuing research and development in the field of cedar joinery. Mr. Sing has developed some very good joinery art, but this patent covers mostly pallet construction that requires no seals between components. A floor is shown with no connections between the flooring pieces such as ordinary tongue and grooves that are used with most floors. Walls are illustrated, but no claims are made on walls and no reference is made to sealed joints between wall siding components. Besides his patent does not apply to sealed joints between components. I personally know Mr. Sing's products and he does not try for sealed joints between components in his operations. This patent does not anticipate my invention.

2f. Little U.S. Pat. No. 5,887,331, Mar. 30, 1999. This is a system to tie down polymer plastic decking planks (not wood planks) to under framing using metal clips. No mention is made of sealing joints between planks and it appears that the planks are outside decking where it is preferable that rain can drain throughout the deck between the planks and not risk puddling. Plastic is free of shrinkage and warping problems and there is no way you can turn these otherwise undesirable features that wood has into useful purposes. This invention does not anticipate my invention and is dated after my patent was filed (Mar. 30, 1999 vs. Feb. 26, 1999).

2g. Hubbard U.S. Pat. No. 5,577,356, Nov. 26, 1996. Mr. John Hubbard is a neighbor and he and his buildings are well known to me. I should also mention that I know the building system covered in Mr. Hubbard's invention. I have viewed buildings under construction and I am continuing to examine buildings that have been standing for up to three years. I have recently and also two years ago, examined his operation from a view of purchasing his company. Mr. Hubbard has conveyed to me the various points of his R&D work including this patent, which he calls his "Phoenix" building. The invention states that the use of an adhesive between touching surfaces is preferred. The builders I saw building these houses were not using adhesives, however, there are signs that an adhesive has been used in a finished building I viewed, but the adhesive was dry and had cracked and, in one case, it had been supplemented by a caulking, which was also drying out. Horizontal tongue and groove joints can and do leak. The joints I have seen were not tight (not so tight that the planks have to be driven together with a 5 kg. mallet as do my plank walls). Weather and resultant alternate shrinkage and swelling had opened up the joints. Most of the horizontal timbers shown in his patent drawings have rounded edges presenting an open vee to the weather. Horizontal rain driven by strong winds force water into tongue and groove joints and a siphon action sucks the water up and over the tongues and into the buildings. Water stains on the inside of the timbers in one of the buildings I viewed clearly showed the ingress of rain or melted snow.

The Phoenix building as introduced in this invention illustrates the use of laminated timbers and posts. Wood must be thoroughly kiln dried before glue lamination and it is correct to assume the wood is dry and would not be subject to the warping and cupping that is necessary for my very tight joint system to happen. Mr. Hubbard's invention relies on an adhesive or caulking to seal out water and does not mention any help from cupping or warping to keep out rain. This invention does not anticipate my invention.

BRIEF SUMMARY OF THE INVENTION

Very small logs only are used to make the tongue and groove planks so small that when the logs are sawn longitudinally into two, each half can produce a plank that either has half the heart or one has the heart and the other is very close to the heart. Each half is made into a green tongue and groove plank being machined to a tight fit between planks. The planks are immediately made into building panels and left to slowly dry out. As they dry, the wood shrinks in such a way that the joints become tighter and tighter until the wood is almost crushed within the joints which become waterproof. This invention also applies to log homes or solid timber houses whose timbers encase the heart of the log they were sawn from.

To understand this phenomenon, one needs to study wood grain and how wood shrinks when it loses water from drying. There are two kinds of shrinkage. One is between the heart and the outer rim of the log. This is called radial shrinkage. The other is along the circular growth rings around the heart. This is called tangential shrinkage. Tangential shrinkage is three or more times as great as radial shrinkage, depending on species. In the round log the wood outside of the log being exposed dries and shrinks faster than the wood near the heart of the log which is not exposed. Shrinkage means less wood on the circumference, which means it has to form splits around the log. If the round log is sawn longitudinally into two similar half logs, then it can shrink around its outer circumference without splitting. The resulting shape after drying has the line of the diameter bent out at the heart forming an obtuse angle. Tangential shrinkage is about 5% so the first 180° line of the half green log becomes approximately a 171° obtuse angle when the half log dries. A piece of tongue and groove lumber that is machined from the small green half log will use the flat edge of the half log as one side and will usually show the heart. When it dries, this tongue and groove plank will bend at the heart to have an angular side of up to 171°, the same as the half log. If a plurality of these green planks are attached together by edge tongue and grooves with all the hearts on one side, the combination, as they dry, will actually form a curved configuration like the side of a large wood barrel. This was the basis of my Ser. No. 09/259,627 application.

Alternatively, if a plurality of these green planks are attached together by edge tongue and grooves with the hearts being one side of the panel for the first plank and the other side of the panel for the second plank and continue with hearts alternating from one side to the other, when they dry they will form a snake-like appearance as each planks will bend in the opposite direction to its adjoining planks. This is the basis for this new application.

Either way is unsatisfactory for a flat smooth building surface, so it is necessary to nail stiff battens across the planks to keep the plurality of planks flat. Also because the thousands of narrow planks in a home would be costly to handle during construction, the manufacture of sections where enough narrow pieces are used to form a two-man load sized section makes sense. Thousands of planks become hundreds of sections and are much easier to sort out. The necessary cross battens to keep the section flat will also frame the section and provide resistance to shear forces. In order to give the section more resistance to this rack or shear force, the cross ties are let into grooves cut out across the face of the planks. The cross ties are set into the grooves tightly and nailed or screwed firmly in place. The nailing should hit the center of each plank and there should be at least four cross ties in a 8 foot high wall section. The individual planks will then be somewhat constrained from bowing and will hang on their nails. Shrinkage will occur and the tongues will need to be long enough and the grooves deep enough that the shrinkage on the edge of each plank will be about a fourth of the length of the tongues. If the plank is 2½ wide the maximum shrinkage will only be about an eighth of an inch which would call for half inch long tongues. In very damp weather the planks will expand some in dry weather the planks will shrink a little in width. There will always be movement in the grooves according to humidity. Though an eighth of an inch is hardly perceptible, this movement can be disguised if the planks are grooved vertically with the shoulders of the outside tongues being set back a quarter of an inch further than the inside shoulders, forming a permanent groove between planks. If the quarter inch wide groove between planks is widened an eighth inch more by shrinkage it can hardly be noticed.

Though the individual planks are restrained from acting collectively by the cross ties, they will still bow individually, forcing the tongues to want to eschew within the tight grooves making the joint even more air tight. This would be the case if the two planks had their hearts on the same side. However, as this new application teaches if the two planks have their hearts showing on opposing sides then the cupping action will be parallel and the full surface of one side of the tongue will be forced against the full surface of one side of the groove in the next plank, whereas in the first instance only the corner of the tongue will be forced against the side of the groove. In tests my new instant configuration proved to be more airtight than the configuration of my first application (Ser. No. 09/259,627).

There are considerable economies in not kiln-drying nor air-drying the planks. Kilns represent a sizable capital investment and months of air drying costs interest on inventory investment. Then there are labor savings either way. The fact is that lower cost more air tight house sections evolve.

A greater economy is the use of only small logs (needed to include the heart or part of it on one side of every plank produced). These logs at today's market are at the price of pulp, only a fraction of the cost of saw logs. The price of pulp logs is substantially lower than logs that are large enough to produce lumber.

Ordinarily, the handling of small logs in a sawmill is more costly than handling larger logs. Imagine passing a 4" log four times past a head saw to square it. I have developed a machine that squares or shapes a log in one pass and another machine that cuts the cross notches (Four in an eight foot plank) as quick as a high powered planer can spit the planks out. A raw barked green small log freshly cut in the forest can be processed into wall, floor or roof sections within minutes and built into a nearby house within the hour.

Logs that have tops three inches or smaller (very, very small logs) cannot be made into two useful planks. However, they can be made into single planks with enough depth to be useful. Here it is necessary to saw two longitudinal shrinkage relief slits on opposite sides of the log and to a depth on each side of the log of one third of the log's diameter and close to being in line with the log's heart. Now the logs can dry out and shrink without splits and checks appearing on the surface. As the logs dry, the saw slits will become vee shaped when the circumference diminishes. The squares have their side slits sawn by the same machine that saws them into squares and are planed so that there are tongue and grooves cut out into their edges above and below the slits. They are then cross-grooved and battens are nailed into the cross grooves making two man-load sized sections. The upper and lower tongue and grooves will act the same way as the single tongues and grooves in the first example, they will cup outwardly away from the heart on each side of the saw slits, but there will be double the resistance to air or water passage through the doubled tongue and groove joints. In order to gain the advantage of more airtight joints every second plank will need to be split into two planks so that the split hearts can be turned outward so the section has alternate planks showing exposed hearts.

Many months of experiments have proved out this phenomenon and that it is consistent. Completely air-dried and kiln-dried sections have been examined. I found that it was impossible to separate the individual planks without breaking off the tongue or one of the sides or the groove. The planks were permanently stuck together as if they had been glued, but still can shrink or expand a little with humidity changes especially if used for open shed unheated situations. The tongues can slide a little along one side of the grooves without hurting the seal between the tongue and groove.

An even greater saving can be realized if trees are plantation grown. Various universities working with pulp and paper companies have developed very low cost wood fiber that grows 8 feet high a year and adds about one inch of new wood in diameter per year at very low cost. It is possible to grow a small log in three years or four logs in five years. As new trees will sprout from the stumps, 250 acres can produce 100 houses a year in perpetuity. The plantation can be planted close to the house factory saving in-freight costs. Using modern tree shearing equipment, the trees can be harvested like harvesting corn. The trick to make the most of this agricultural progress is to build my houses using only small, low-cost logs, which can be thinnings or the tree tops of older trees that can produce lumber sized logs, a higher and better use than pulp or firewood which is usually the fate of these small logs.

It is essential to have the cross ties across planks whether the planks (or logs) are vertical, or horizontal as in a log wall. This hangs the planks (or logs) individually on the cross ties and the possible shrinkage of each plank (or log) will not accumulate causing settlement which is the bane of the log homes made from green or undried logs. Also, as noted before, the notched-in cross ties are essential to resist shear forces. My new invention allows another method for making watertight sections where the cross ties for vertical timber walls or anti-settling ties for horizontal timber walls can be hidden internally and will keep the timbers in the same relation to each other when they individually shrink in size. Here logs are sawn in half longitudinally with the saw cut either bisecting the log's heart or being close to it. Half the logs are planed so that they have grooves planed in each edge so that they will fit together to form panels of half logs. However, the half logs will be placed so that the heart sides and round sides will alternate from log to log from one side to the other. The double groove logs will have notches cut lengthwise on each edge of the rounded area so that hook like appendages are formed on each edge. The half logs with grooves at each edge are left rounded. A two ply section is formed by hooking the notches of a one ply section to the notches of another one ply section. The notched sides are further machined by having grooves cut across the notched faces to take cross ties, which are nailed internally as each plank is set on either side of the two ply section. This configuration as previously described sets up the opposing green half logs so that when they cup the cupping action will force the tongues of the half round planks against the side of the grooves at the flat side of the notched half round plank, making a watertight building section.

The assembly of sections using the previously described very, very small logs with 3 inch tops would be greatly improved if the small logs that are split to form alternate parts of the sections are hooked together similar to the way described in the above two ply wall or roof section.

A simpler watertight wall or roof section can be made from half logs that are machined so that each half has tongue and grooves machined into their round surfaces that are parallel to the flat surface and are cut so that if one piece of half log is flipped over its tongues will exactly fit the grooves of another half log. The round surfaces will take on a stepped pyramidal shape and are called pyramid planks. Besides being locked together by tongue and grooves the pyramid planks are held together by cross ties let into the inside face of the planks with each plank being nailed close to its center line to the rabetted-in cross ties. With four cross ties being used a two man load sized section or panel can be formed that will resist shear forces. As the individual planks are greenwood they will shrink on the cross-tie nails and the joints between the planks will open up. Water that gets in will not pass the squeezed wood part of the joints and weep grooves are cut in the top of the top tongue to drain away rain that gets into the opened joints. To hinder the sideways movement of wind driven rain towards the open joints Veed striations are cut into the top surface or exposed surface of the planks forming the sections.

If greenwood manufactured sections are stored for somtime out of the weather they will start drying out, which will askew the tongues and grooves of the planks at the edge of the section and often make them difficult to join together without splitting off tongues or a side of a groove. The best remedy for this is to have plank sized cover boards cover the joints between sections which give a pleasing board and battan appearance and also strengthens the wall or roof.

Better still, is to cut deep grooves into the edges of the cover planks, which would provide tongues that could lock into similar sized deep grooves cut into the edges of the planks at the section junction. If the exposed side of the cover plank exposes a heart then the cover plank, if green will force a much tighter locked in joint cover plank as the planks dry further. The grooves in the edge planks on each side of the section are made larger than the tongues formed in the cover plank so that it is easier to join the sections together.

There are other applications such as ceiling beams or log walls where heavy components are exposed to view on both sides where let in cross ties with nail or screw heads showing are not acceptable. Here the purpose of the cross ties can be served by the use of the long nails or screws that cross two timbers being approximately half threaded and half smooth and are spaced to give the desired resistance to shear. In the case of horizontal members accumulated shrinkage or settlement can be avoided using screws that pass down through an upper log and down through 80% of a lower log. The lower log will shrink on the screw threads and maintain their respective relationships, but the crack between the logs will widen slightly. However, the two logs won't settle because they will be held up in place by the heads of screws fastening the two logs below them together. Such screws can take 1700 pounds of weight before the wood on the side of the screw threads is stripped and the point of the screw is forced deeper into the 20% of the lower log remaining. Second floor platforms, partitions and walls are supported by posts and beams along with the roof. The weight on the screw heads in a upper wall is negligible and the spacing of the screws for shear will govern though each building will need to have engineering calculations made to confirm the spacing of the screws particularly in the lower quarter of the log walls of each floor. In the case of the use of horizontal components that are attached to stud walls the studs will carry the weight of the floors, walls of second and third stories and roofs above.

Larger logs for log houses, or large timbers with encased hearts, will not adapt to sectionalizing because of weight. Here it will be necessary to peel the logs and cut the side shrinkage relief slits into them before storing under conditions where they will dry and shrink. Shrinkage will cause the slits to open up V-like. The logs will be easier to assemble if planing the tongue and grooves into the logs or timbers is delayed until the logs are about to be delivered to the building site. As logs take many months to dry out thoroughly they will continue to dry and shrink after the log house is built, skewing the tongue and grooves into tighter fits. Even if they are fully dried out when constructed into a log house they will pick up moisture from the air and expand skewing the tongue and grooves in a reverse way for tighter joints. We win either way. To take advantage of my more waterproof wall system, every second timber in the wall will be split close to the heart (the same as the shrinkage relief slits and the split 3" small timbers previously referred to). The half timbers will be set in the wall so the half hearts are exposed on each side of the wall.

BRIEF DESCRIPTION OF THE SEVERAL VIEWS OF THE DRAWINGS

FIG. 7A illustrates a panels made from four green planks with the first and third planks having hearts on one side and the second and fourth having hearts on the other side. Note that planks one and three have grooves on each edge and planks two and four have tongues on each edge. This is the main basis for this new application.

FIG. 8A shows how the panel in 7A will twist into a snake like configuration when it dries (again angles are exaggerated for effect).

FIG. 9 shows a panel of green planks that have been reinforced by having cross battens let into grooves across the panel and nailed. The first and third planks have grooves on both edges with their hearts on the topside. The second and fourth planks have tongues on both edges and their hearts are on the underside. Note that the second and fourth plank have their top shoulders cut back to form grooves on the top surface.

FIG. 10 shows how a panel fabricated as in FIG. 9 behaves when the planks become completely dry.

FIG. 11A shows how part of the panel in FIG. 10 looks in double scale.

FIG. 11B, also in double scale, shows the male and female side of two sections and their means of jointing using quarter cut wood between sections.

FIG. 25 illustrates how four green plank combinations shaped as in FIGS. 21 and 22 are made into a special panel made up of solid pieces with tongues on both sides and on either side of the saw slits which are alternated with double grooved pieces, as shown in 22, set into the panel so that the exposed hearts both face outward. The panel is assembled by inserting battens into grooves cut across the green planks and tightly nailing them together.

FIG. 26 illustrates what will happen to a panel made from green planks as shown in FIG. 25 when it becomes thoroughly dried out.

DETAILED DESCRIPTION OF THE INVENTION

Figure 1:
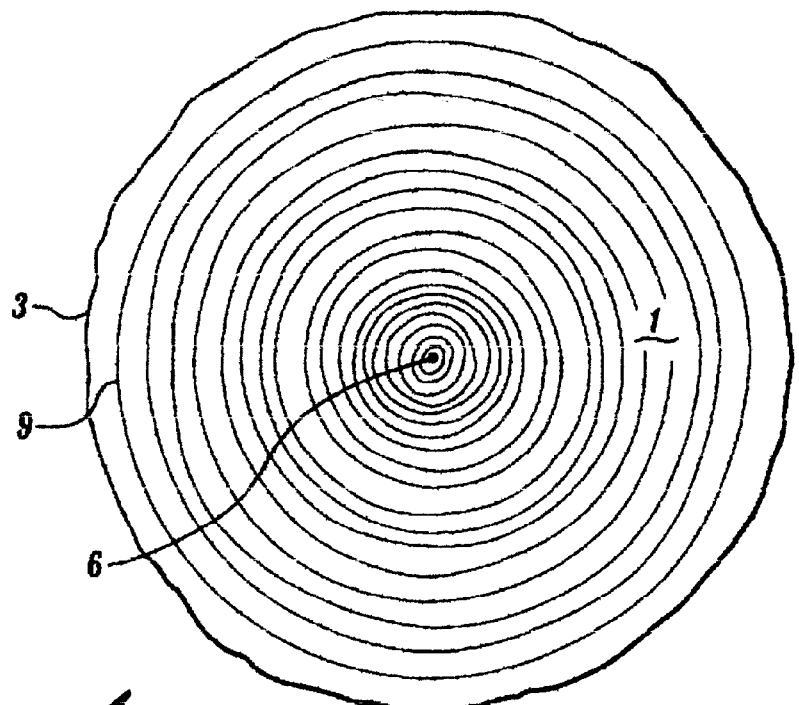
FIG. 1 shows a peeled raw green log having a 4 inch diameter top.

FIG. 1—1 indicates raw green untreated wood; 3 is a log having a 4 inch top which has its bark removed; 6 is the log's heart; 9 indicates an annular growth ring.

Figure 2:
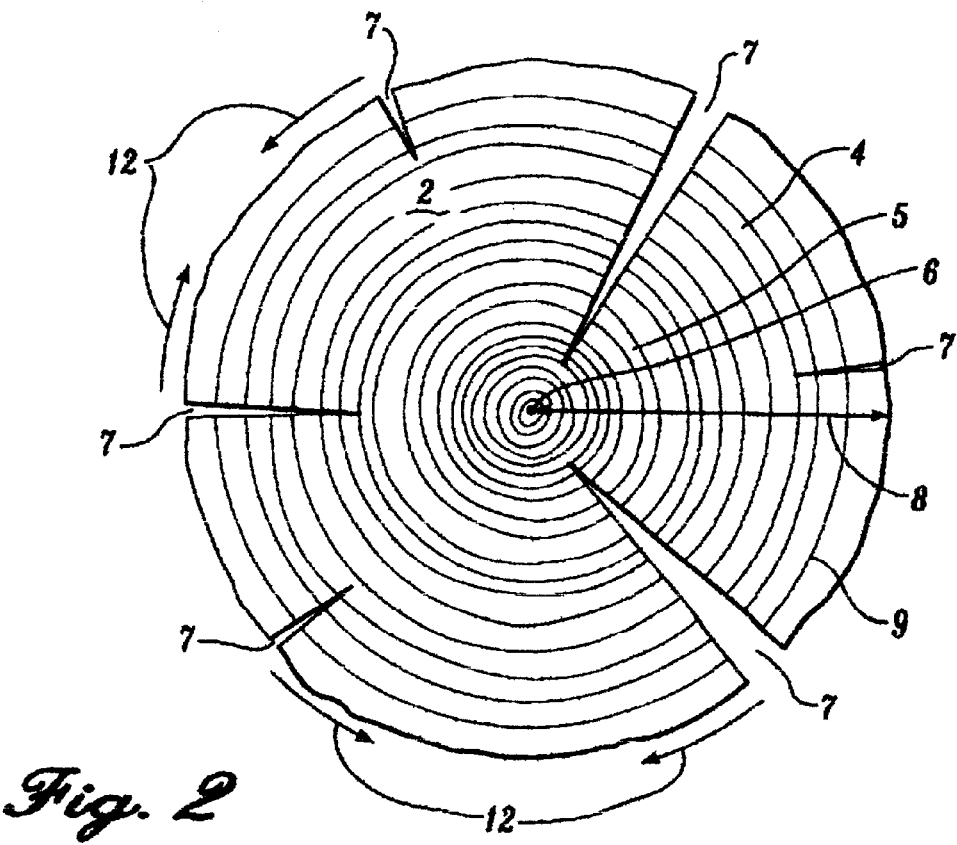
FIG. 2 illustrates a log that has been allowed to dry with resultant checking from tangential shrinkage and the lessening of the diameter of the log from radial shrinkage.

FIG. 2—Indicates a log similar to FIG. 1 that has been thoroughly dried; 2 indicated dry wood; 4 covers the log itself; 5 is wood near the heart of the log which has dried more slowly being farther from the log's surface; 6 is the log's heart; 7 shows splits or checks that happen when a round log dries out; 8 indicates radial shrinkage; 9 are growth rings; 12 indicates tangential shrinkage. Logs should not be allowed to dry in the round. To avoid loss of product through splitting, logs are usually sawn and dried or kept wet in a pond or by spraying with water.

FIGS. 3—10 is a raw green log that has been sawn longitudinally into a half log bisecting the log's heart (6); 1 indicates raw greenwood; 9 indicates growth rings.

Figure 4:
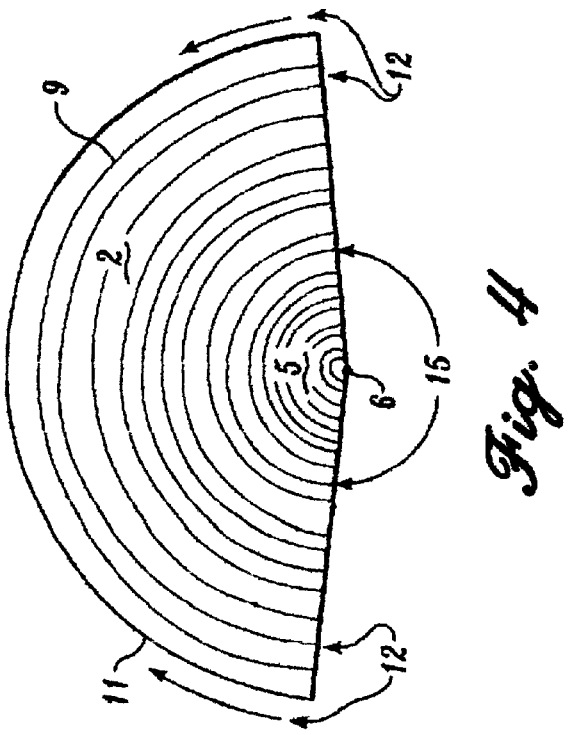
FIG. 4 shows how the half log shown in FIG. 3 dries and does not check and split, but is altered so that the former flat side becomes an obtuse angle (angle is somewhat exaggerated). The half log is lessened in size due to radial shrinkage.

FIG. 4—Shows that a half log when allowed to dry (11) does not split or check. Tangential shrinkage (12) lessens the circumference of the half log when drying from 180° in the green to about 171° when dry. 2 is dry wood; 5 is slower drying wood near the heart; 6 is the heart; 9 is growth rings and 15 illustrates how the flat sawn surface of the green half log becomes an obtuse angle.

Figure 5:
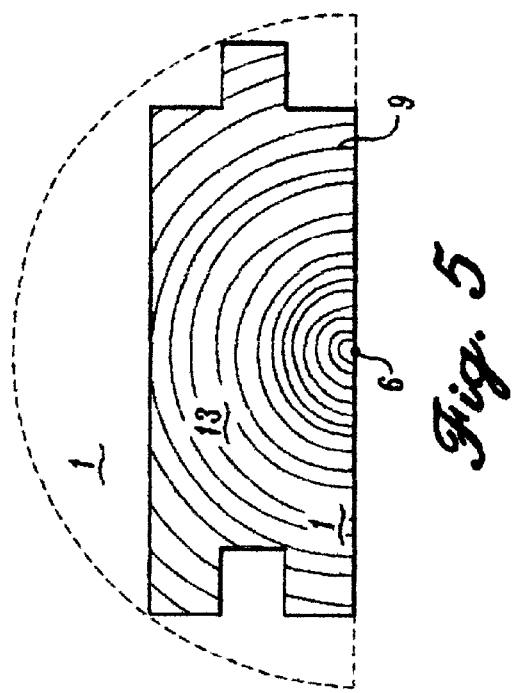
FIG. 5 illustrates how a tongue and groove plank can be machined from a half green log, as shown in FIG. 3.

FIG. 5—Shows how a tongue and groove plank (13) can be milled out of a green half log (1); 9 is a growth ring and 6 is the heart which is on one side of the plank. Small logs are used because, by using only small logs, a maximum number of planks can be developed that have hearts on one side or near it. Also small logs are substantially lower in cost then larger logs, called "sawlogs."

Figure 6:
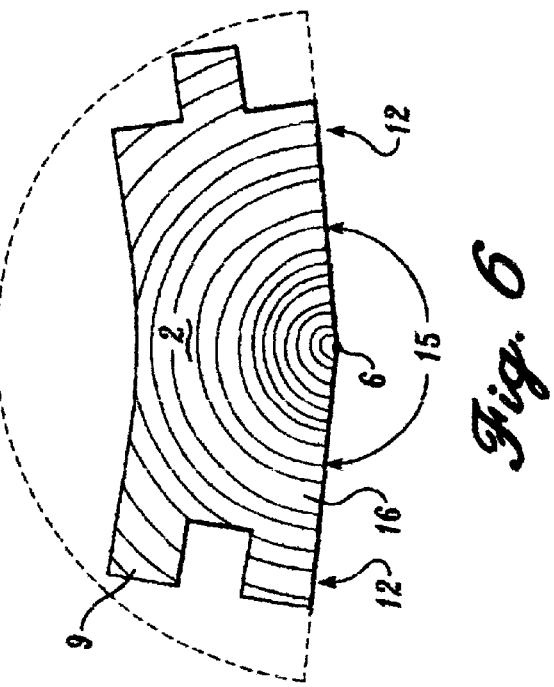
FIG. 6 illustrates how the plank cut from the green log (FIG. 5) cups away from its heart when it is dried (but does not check or split). Both surfaces form angles, the bottom side is an obtuse angle and the top angle is acute (angles again are exaggerated to show change).

FIG. 6—Shows how "cupping" of lumber occurs (16) when a green plank as in FIG. 5 becomes dry. Tangential shrinkage (12) literally bends the plank at its heart (6) giving that side an obtuse angular (15) side, matching the cupped other side; 2 indicates dry wood; 9 are growth rings.

Figure 7:
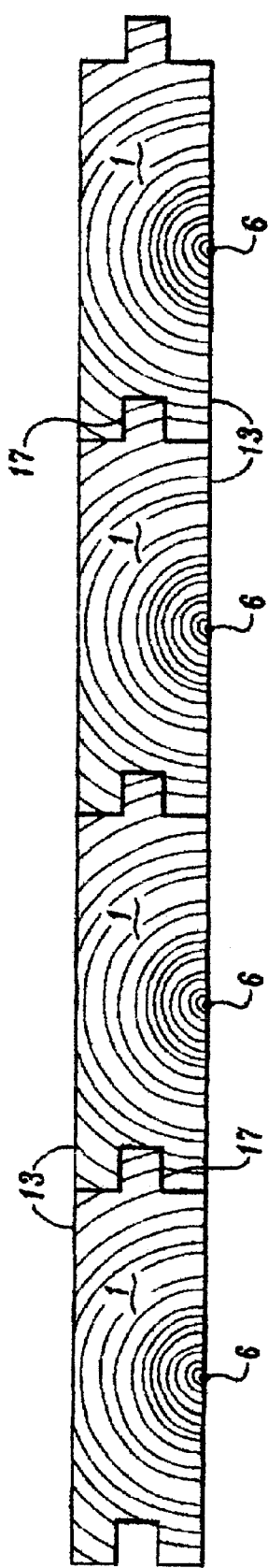
FIG. 7 illustrates a panel made from four green tongue and groove planks, with each having a heart showing at the center of each plank at the lower surface. This illustration was used in my patent application Ser. No. 09/259,627.

FIG. 7—Here a panel is made up out of four green (1) tongue and groove wood planks (13). Tight-fitting tongue and grooves (17) hold the panel together. Note that the hearts (6) are all on one side.

Figure 8:
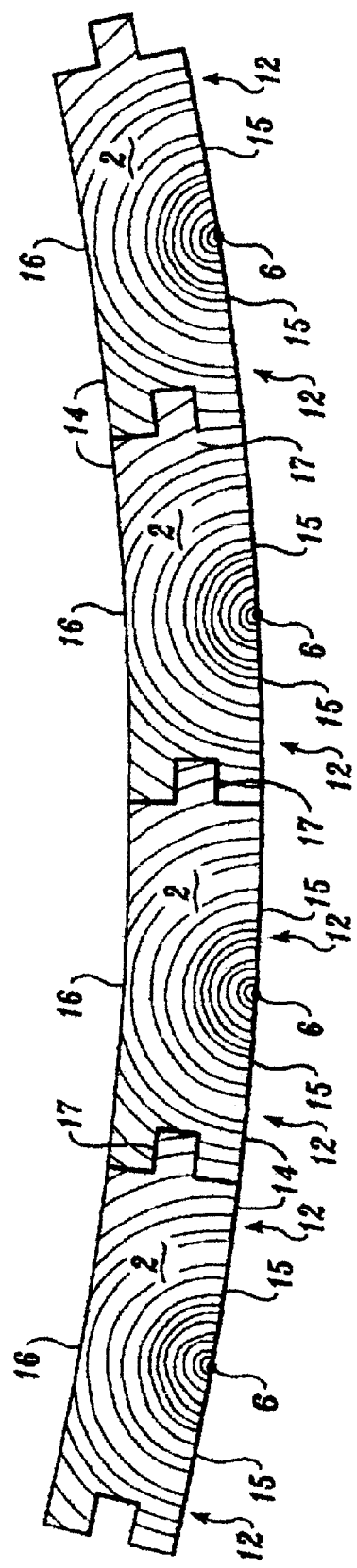
FIG. 8 shows how the panel (FIG. 7) will bow into a curved configuration when it dries (angle of bends in each planks are more realistic, also used in Ser. No. 09/259,627).

FIG. 8—Here the panel in FIG. 7 is allowed to thoroughly dry (2). The individual planks (14) behave as shown in FIG. 6 and the tight joints (17) become even tighter. This causes the panel to take on a curved configuration like the side of a large barrel. 2 indicates dry wood; 6 shows the hearts all on one side; 12 indicates tangential shrinkage; 15 indicates obtuse angles and 16 shows cupping on the other side.

FIG. 7A is similar to FIG. 7 except that the hearts on the first and third planks are on one side of the assembly and the hearts of the second and fourth planks are on the opposite side, also the first and third planks have grooves on both edges and the second and fourth planks have tongues on both edges. Here the simple difference between my application Ser. No. 09/259,627 and this new application is shown. By having the hearts alternatively on different sides the effect of shrinkage will differ.

FIG. 8A Here, instead of warping in a simple curve, the planks take on a snake-like configuration. The warpage is exaggerated for effect in the drawing.

FIG. 9—Shows a four plank panel made of green (1) planks (13) which are reinforced with cross battens (18) let into cross grooves across the planks to one third of the plank's thickness. The cross battens are thoroughly nailed (19) to each plank. The cross tie is dry (2); the hearts (6) are on alternative sides of the panel; 17 indicates tight tongue and groove joints. This is a very solid building panel. 22 are special grooves cut into the exposed face of the planks to disguise shrinkage. Like FIG. 7A, the hearts alternate from one side to the other and planks 1 & 3 have grooves on each side and 2 & 4 have tongues on each side.

FIG. 10—Shows what happens when the panel in FIG. 9 is thoroughly dried out. Though constricted by the stiff cross battens (18) each individual plank (14) wants to behave as it did in FIG. 6 and they still cup (16) a little and bend (15) causing the tight tongue and grooves to be forced into opposing directions and bind very tightly together (see 12A and 55 in FIG. 11) so that the wood in these tongue and grooves is almost crushed. In any case the section is stronger dry than green as in FIG. 9 and is air-tight; however, the tongues are not askew in the grooves as in application Ser. No. 09/259,627. The sides of the tongues are parallel to the sides of the grooves, providing very tight contact for the length of the tongue not just at its corner. 2 is dry wood; 6 are the hearts; 12 is tangential shrinkage; 14 are the planks dry; 15 shows obtuse angles based on the hearts and 16 represents cupping; 17 indicates the original tight joints; 18 indicates the cross ties and 19 is the nails. 22 are grooves that disguise shrinkage. The alternate configuration of heart side and tongue and groove proved to be, from tests, actually watertight not nearly watertight, as claimed in application Ser. No. 09/259,627, because the tongue engages the side of the groove for its whole length, not just at the corner of the tongue. This is the main improvement of this invention over application Ser. No. 09/259,627.

FIG. 11A—Is a double scale drawing of part of the panel, FIG. 10. This shows the crushing forces at 55 and 12A and gaps 29 and 30 between planks caused by both tangential and radial shrinkage. 22 is a special groove cut into the face of the planks at the joints. This gap disguises the small shrinkage and expansion, which occurs on such narrow planks both during the original shrinkage when the planks dry out and when there is lesser shrinkage and expansion of the planks due to changes in humidity. 30 are gaps formed between the tongue and grooves because of distortion caused by radial shrinkage.

FIG. 11B. When the individual planks at the edges of section dry out they will cup and it will be harder to force the sections together because of the askew tongues and grooves; however, if so called quarter cut wood is used at the joints between sections, then there will be no cupping and the sections are more easily forced together. If a plank is sawn in half lengthwise at or near its heart, edge grain wood or quarter cut wood will be formed. Also, if tongue and grooves are planed into the sawn edges and the halved planks are set on each side of the section, then quarter cut joints are formed that will not twist. 6 indicates split hearts, 31 and 32 indicates the joint between sections, and 33 and 34 shows the joining action. The composition of the sections is otherwise the same as in 11A.

Figure 12:
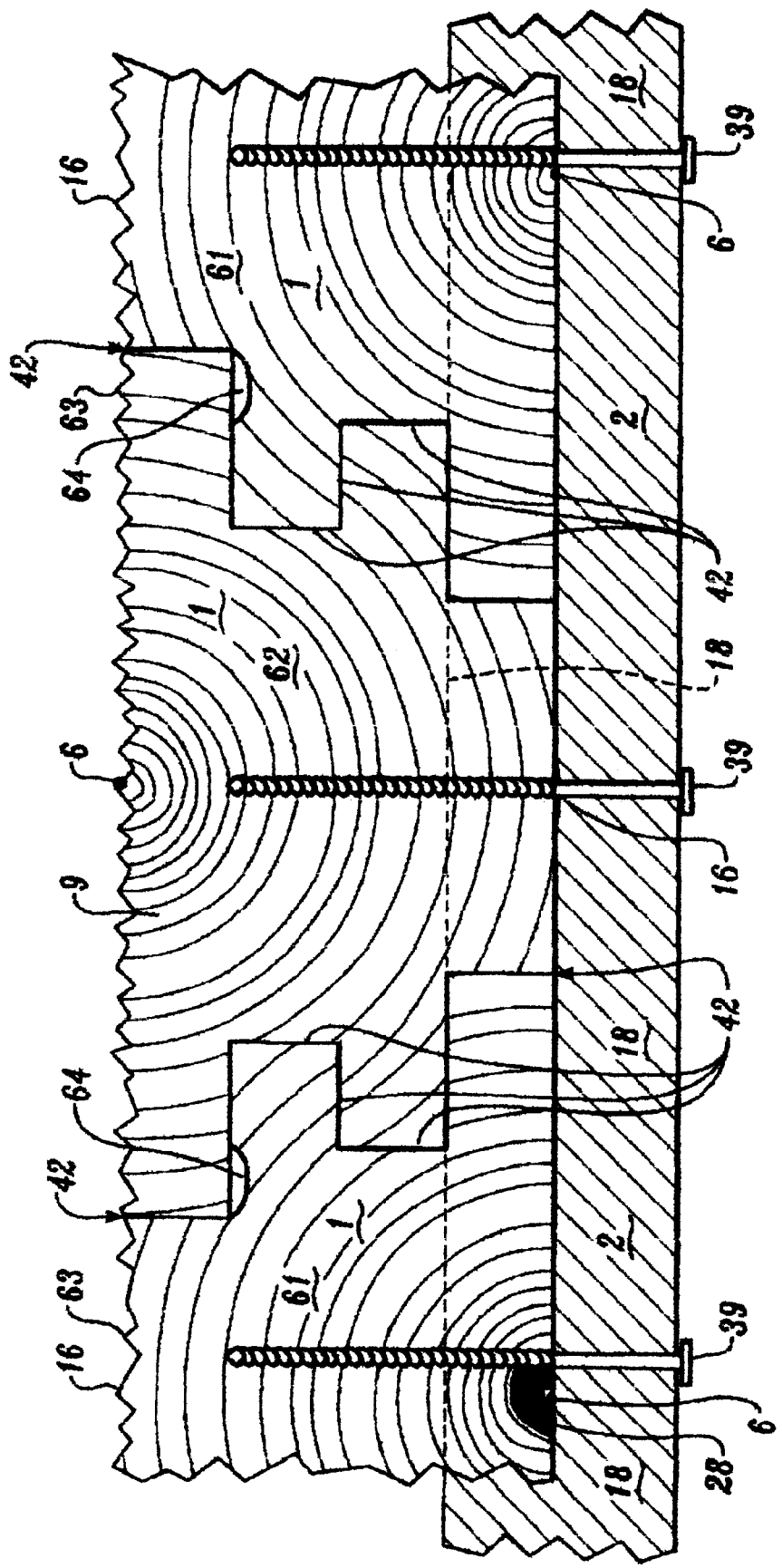
FIG. 12 illustrates Greenwood planks having a pyramid shape that have been machined out of half logs about 6 inches in diameter and formed into a panel of similar planks with the pyramid planks being set alternatively up and down and fitted tightly together. Cross ties have been rabbeted into the tops and bases of alternately set planks which are locked together by tongue and grooves and firmly screwed into place. Note weep grooves have been milled into the top of tongues of the center plank and that the top surface of the panel has been machined to have striated vees to stop sideways movement of water.
Figure 13:
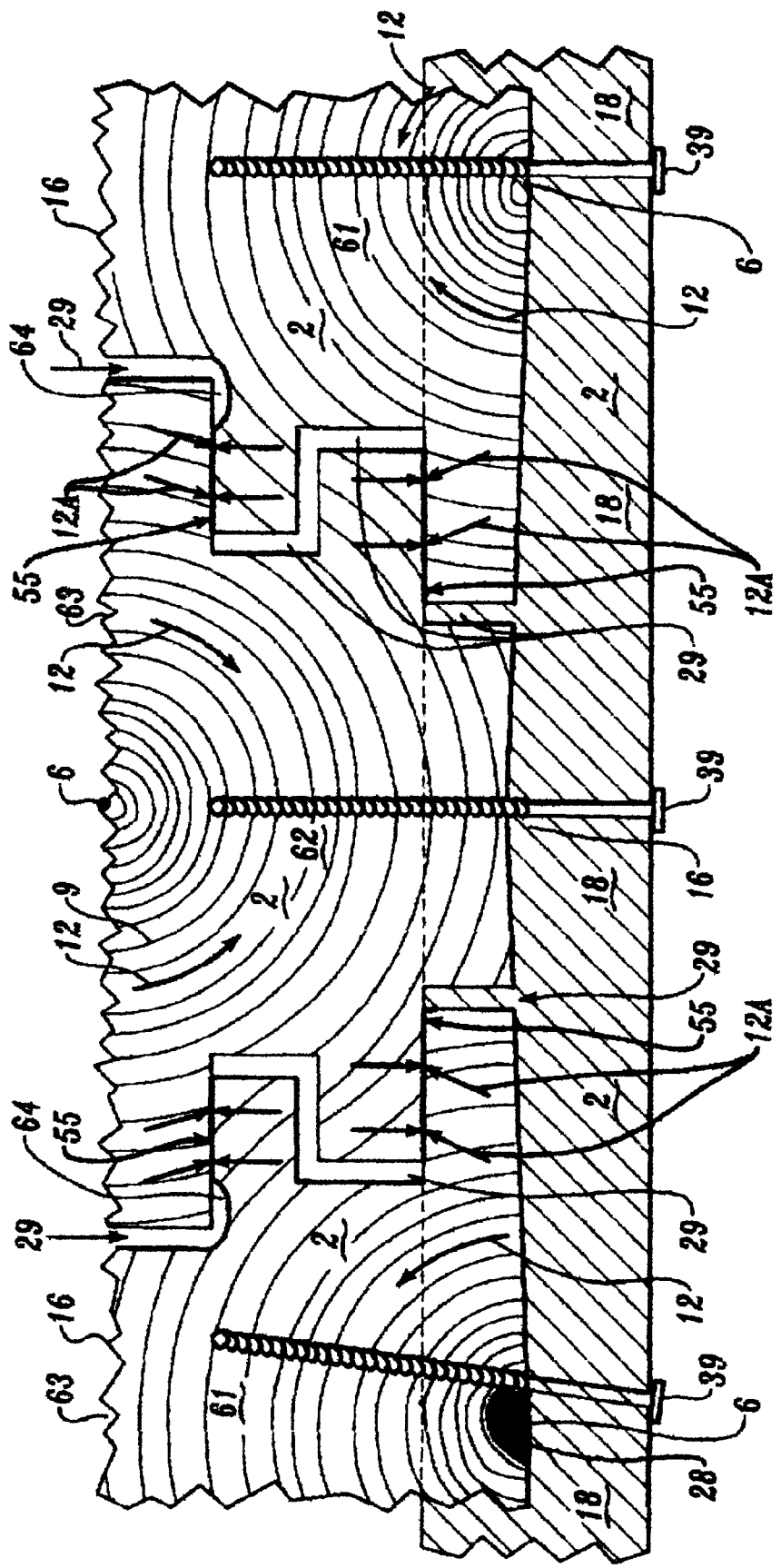
FIG. 13 shows the plank panel illustrated in FIG. 12 after six months of air-drying or twelve days in a kiln. The planks have shrunk radially in size and they have cupped from tangential shrinkage. The cupping action squeezes each tongue tightly to the side of the grooves in adjacent planks.

FIGS. 12 and 13 show a pyramidal shaped roof plank system. The planks are formed out of small half logs so the hearts 6 are either exposed or are close to the base line of the pyramid shapes. The planks are fitted tightly together 42, and are Greenwood. One log shows a soft heart, 28, which is on the inside of a wall or roof. The cross tie, 18, which is dry, 2, is very securely screwed 39 to the center of each pyramid plank. Each plank will shrink 29 onto its screw, but the tongue and grooves are far too deep in relation to the plank width to shrink out of contact. A weep groove 64 for roof construction is designed to drain away water that will get in between the planks as they separate on shrinking on their screws. The top surface of this roof surface is striated (with vee grooves) 63 to help rain to only go downward and not be blown across the planks into spaces between planks. This watertight joint system between roof planks if used with my waterproof plank design Ser. No. 08/640,187, which also has to use planks with hearts encased or at or near the plank edge, a waterproof roof system evolves, which needs no shingles, tile or other roofing and also saves the labor of applying the roof covering. Besides having a striated surface to keep rain away from joints between planks and a weep groove system to drain any water away that will get into the joints. Double tongue and grooves on each side of the planks are extremely tight fitting after the wood dries. Tangential shrinkage forces the tongues so tightly to a side of each groove to almost crush the wood. The joints become airtight and watertight. Tangential shrinkage is designated by the arrows, 12 and 12A, that designate the direction of the tangential shrinkage. 55 indicates where wood is almost crushed forming the real moisture seal. No caulking compounds are needed to keep water out.

Figure 14:
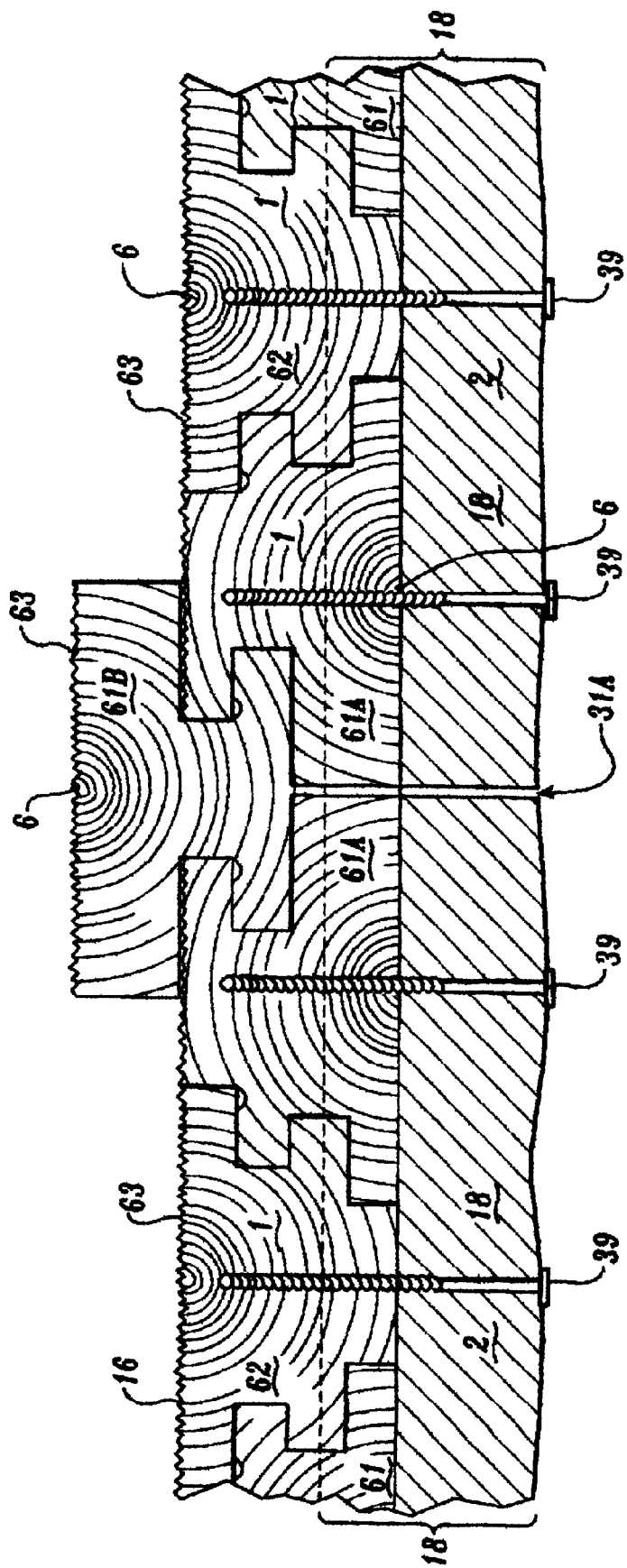
FIG. 14 shows a wall or roof panel having tightly fitting greenwood components. In this case the panel is composed of pyramid planks as in FIG. 12. This figure features an "H" Ayche shaped cover piece that locks two sections together and produces a watertight joint between these sections.

FIG. 14 shows a junction between two panels of pyramid planks as in FIG. 12. Here a cover piece (61B) is used to provide a sure waterproof joint between sections. This cover piece is "H" Ayche shaped and was introduced in my application (Ser. No. 08/640,181—Apr. 31, 1996). It has its heart on the top side so its edges are forced down on the edges of the sections it covers and the joints get tighter as part 61B dries. Parts 61A are a combination planks with pyramidal steps on one edge and grooves to fit the "H" pieces on the other edge. Parts 61A are set on each side of each section.

FIGS. 15 to 27—Illustrate the use of very, very small logs with diameters as narrow as 2½" at the top of the logs. These drawings are based on logs with 3" tops. To get 2 planks from such small logs is not practical nor useful. But planks can be made using the whole log. Planks as thick as 2½" are quite strong and such narrow widths are considered attractive, especially when shrinkage disguising grooves are used, which give accent to paneling.

Figure 3:
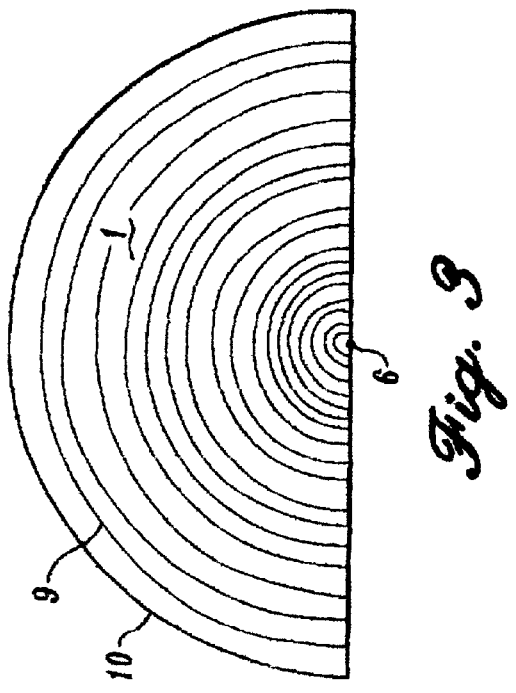
FIG. 3 shows a half raw green small log that has been sawn lengthwise through its heart.
Figure 15:
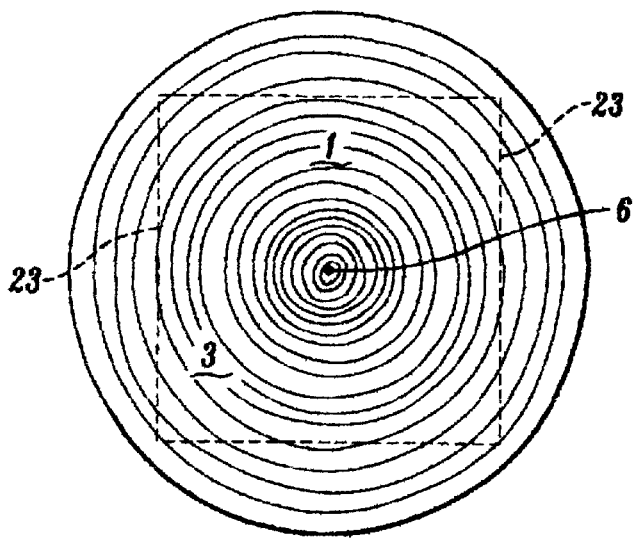
FIG. 15 shows a raw green smaller log having a 3 inch top with an indication of how the log can be sawn to produce a maximum sized square green plank.

FIGS. 15—3 is a green log without bark. Indicated also is the size of the plank 23 that could be made from this log; 1 is greenwood; 6 is the log's heart; 23 indicates the square plank that can be made out of this log.

Figure 16:
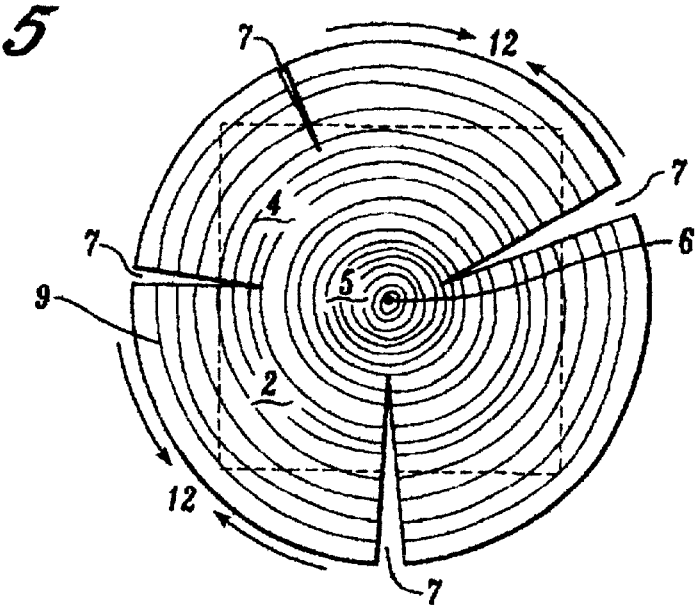
FIG. 16 illustrates how a raw green log in FIG. 15 will split and check from tangential shrinkage when it becomes dry. It also shows that a green plank sawn out of the log would also split and check. Both the log and the suggested square plank will be smaller due to radial shrinkage.

FIG. 16—Is a dry (2) very small log (4); 5 is the wetter heart area of the log; 6 is the log's heart; 7 are splits and checks caused by tangential shrinkage; 9 are growth rings. Again, a square plank (23) is indicated and it also has splits and checks, as does the dry log. 12 indicates tangential shrinkage. Again, it is stated that round logs should not be left to air dry and should not be kiln dried. Their wood would become almost useless. To avoid such waste, logs are left in log pounds or sprayed with water until they can be sawn in a manner so as to avoid splitting.

Figure 17:
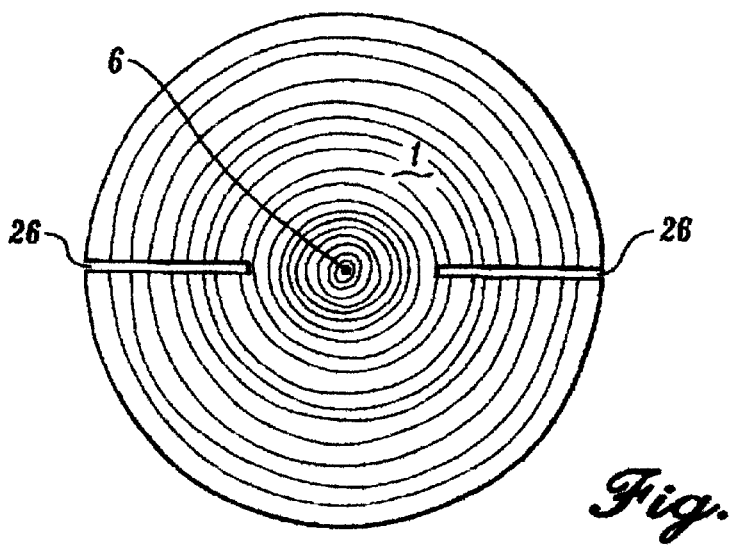
FIG. 17 shows a raw green log that has had two saw slits cut into its surface on opposite sides with the slits pointing at the log's center and each slit reaching to a point one third of the log's diameter from its surface.

FIG. 17—Shows how to prevent splits and checks by cutting longitudinal shrinkage relief saw slits on opposing sides of the log with the slits being in line or close to being in line with the heart. The slits are approximately one third of the log's diameter deep; 26 are the shrinkage relief slits; 6 is the log's heart. 1 indicates greenwood.

Figure 18:
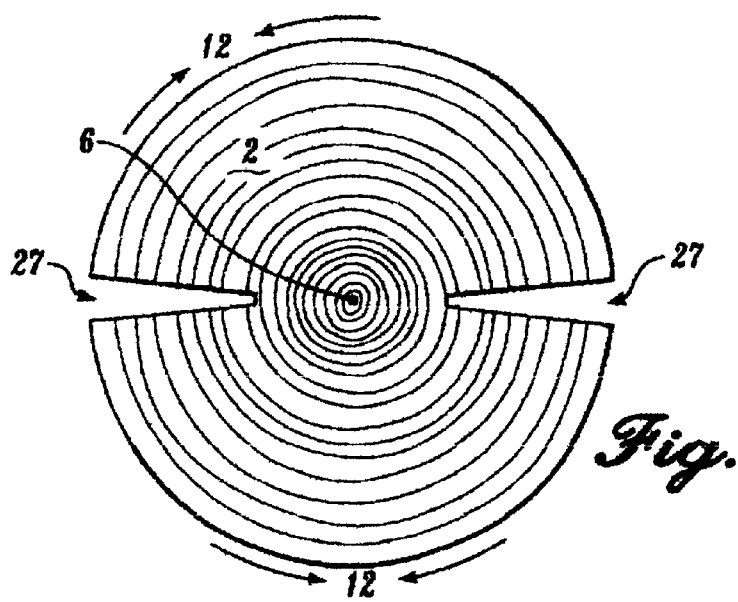
FIG. 18 shows what happens to the log in FIG. 17 when it thoroughly dries and shows how the saw slits turn into V's and no splits or checks occur on the log's surface.

FIG. 18—Is FIG. 14 dried out (2). The log has no splits; the slits are now wide checks (27); 12 indicates tangential shrinkage; 6 is the heart; 2 is dry wood.

Figure 19:
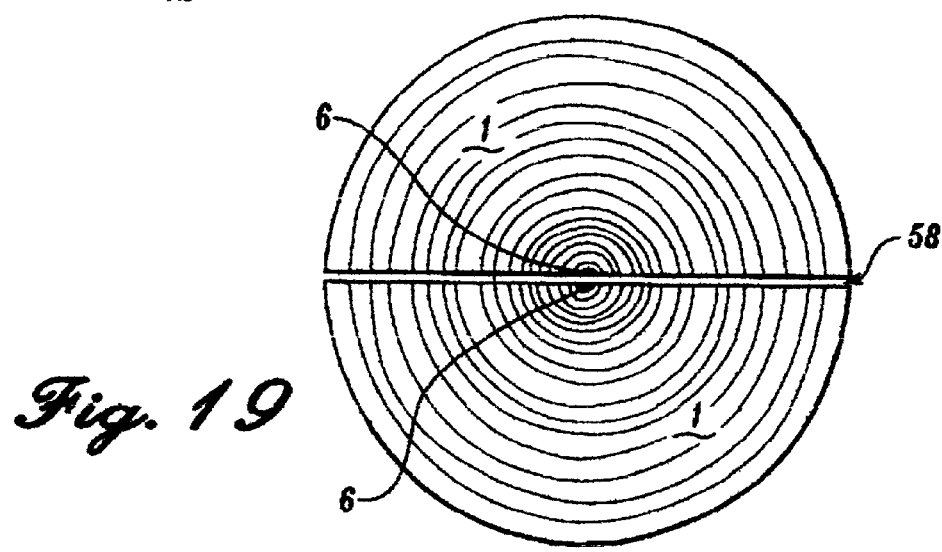
FIG. 19 shows a green log that has been split in half with the saw cut passing through the log's heart.

FIG. 19 illustrates how a log can be split in half longitudinally at the heart or close to it. This will also avoid splitting 58 is the saw cut splitting the log 6 is the split heart. 1 is greenwood.

Figure 20:
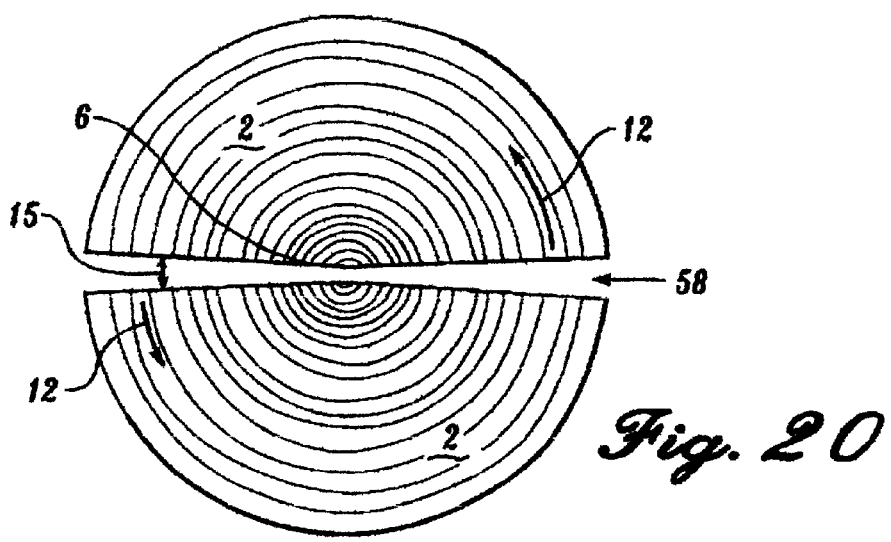
FIG. 20 shows how a 3 inch smaller log that has been split longitudinally in half behaves on drying (similar to FIG. 4).

FIG. 20 shows that a split log behaves the same as the log in 18 that has the shrinkage relief saw slits. 58 is the saw cut splitting the log. 12 Is the tangential shrinkage. 15 is the obtuse angle. 2 is drywood.

Figure 21:
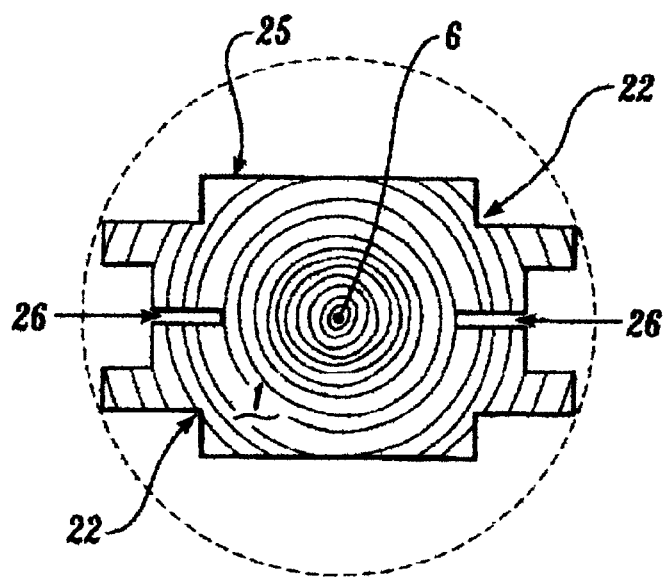
FIG. 21 shows how a plank having four tongues can be machined from a 3 inch green log. It also shows how saw slits as shown in FIG. 17 are also cut into the sides of the four tongue plank in between the two sets of tongues.

FIG. 21—shows how a four tongue plank (25) can be milled from the same small log. Note the saw slits (26) are included. The log is green (1); 6 is the heart.

Figure 22:
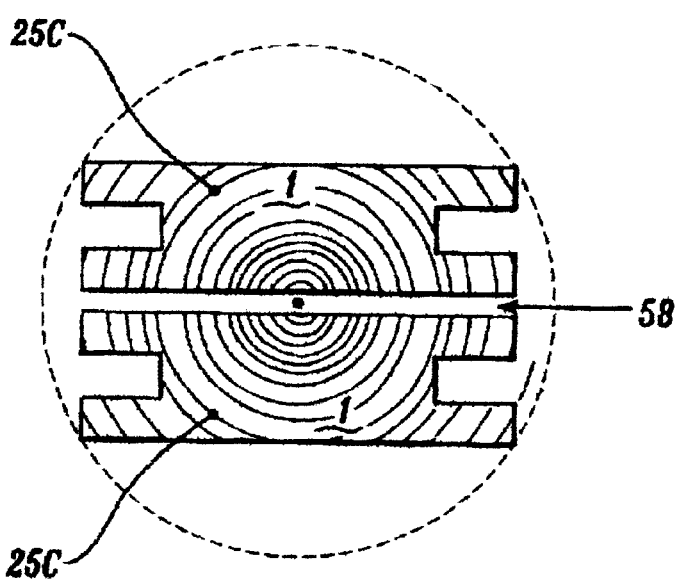
FIG. 22 shows a configuration where a very small green log is sawn into two pieces similar to the pieces shown in 7A with each piece having grooves in each edge to fit the tongues in FIG. 21.

FIG. 22 shows how two pieces of planks have grooves machined into each edge of each piece. The planks are similar to the first and third planks in FIG. 7a and are green. The grooves are sized to fit over the tongues I FIG. 21. 1 indicates greenwood, 25c are the individual planks having grooves on each edge, and 58 is the saw slit between the planks.

Figure 23:
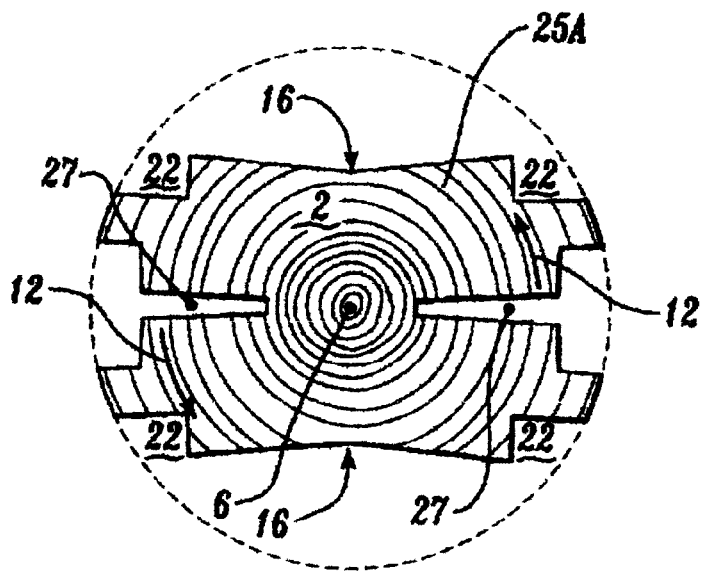
FIG. 23 illustrates what will happen to the green plank in FIG. 21 after it becomes thoroughly dried out. Note that there are four tongues.

FIG. 23—Shows how shrinkage can misshape the green plank shown in FIG. 21. However it still is a four tongue plank; 2 is dry wood; 25a is the dry plank itself; 12 shows tangential shrinkage away from 27 which now a has a wide split instead of being the simple saw slit shown in FIG. 21; 6 is the heart; 16 indicates cupping.

Figure 24:
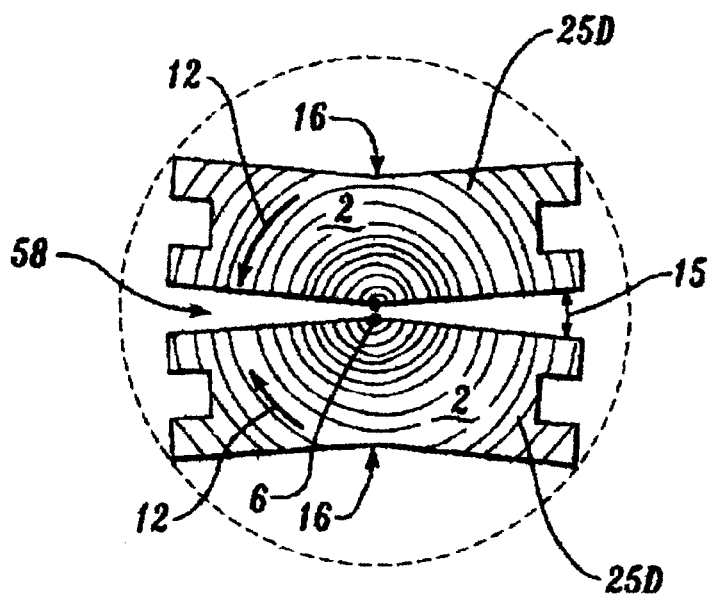
FIG. 24 shows how the half pieces shown in 22 behave when they are dried. Note the planks have grooves on both edges.

FIG. 24 shows how the two half planks behave the same as the single planks in 22. Note that planks with grooves on both edges are shown, 25D. 15 indicates tangential shrinkage, 16 indicates cupping, 2 is drywood, and 6 indicates a split heart. 58 is the saw cut between planks.

FIG. 25—This is a panel of two, four tongue green (1) planks (25) (and two pairs of half planks with grooves at each edge 25C) attached together by tight tongue and grooves (17) and further tied together by cross battens (18) which are set in grooves across the planks which are one half of the half plank's thickness in depth. The cross battens are securely nailed (19) to each plank. 2 is dry wood in the cross battens; 6 are the planks hearts; 26 are the saw slits; 28 is a soft pith heart or such a defect as black heart or even dry rot, which is solidly encased in wood; 17 indicates tight tongue and groove joints; 22 is a special groove designed to disguise shrinkage and expansion, 58 is the space between the two half planks. 1 indicates greenwood.

FIG. 26—Is similar to FIG. 25 and shows the panel after each plank has individually dried out and shrunk. The side slits have widened out to wide splits (27). The top and bottom sides of the planks have cupped (16) but not as much as in FIG. 23 because of the restraint of the cross battens (18). However, the cupping action, on both sides of the hearts, has forced the tongue and grooves to be much tighter together and more air tight than in FIG. 25. 2 is dry wood; 6 are hearts; 9 are annular rings; 12 indicates tangential movement; 17 are tight joints, 19 are nails; 18 is the cross batten; 22 are the special decorative grooves that hide wood movement; 28 is a pencil sized soft pith heart, a black heart or even dry rot; 25a are the dried out planks; 29 are spaces now between the dry planks. 54 are small cavities in the wood at the end of the nails that happen when the cupping of planks 25D pull the nails out of the wood slightly. Note that this does not happen with nails through the heart of the wood. 12A indicates extreme pressure from tangential shrinkage. 55 indicates wood that is almost crushed by the extreme pressure forming waterproof joints.

Figure 27:
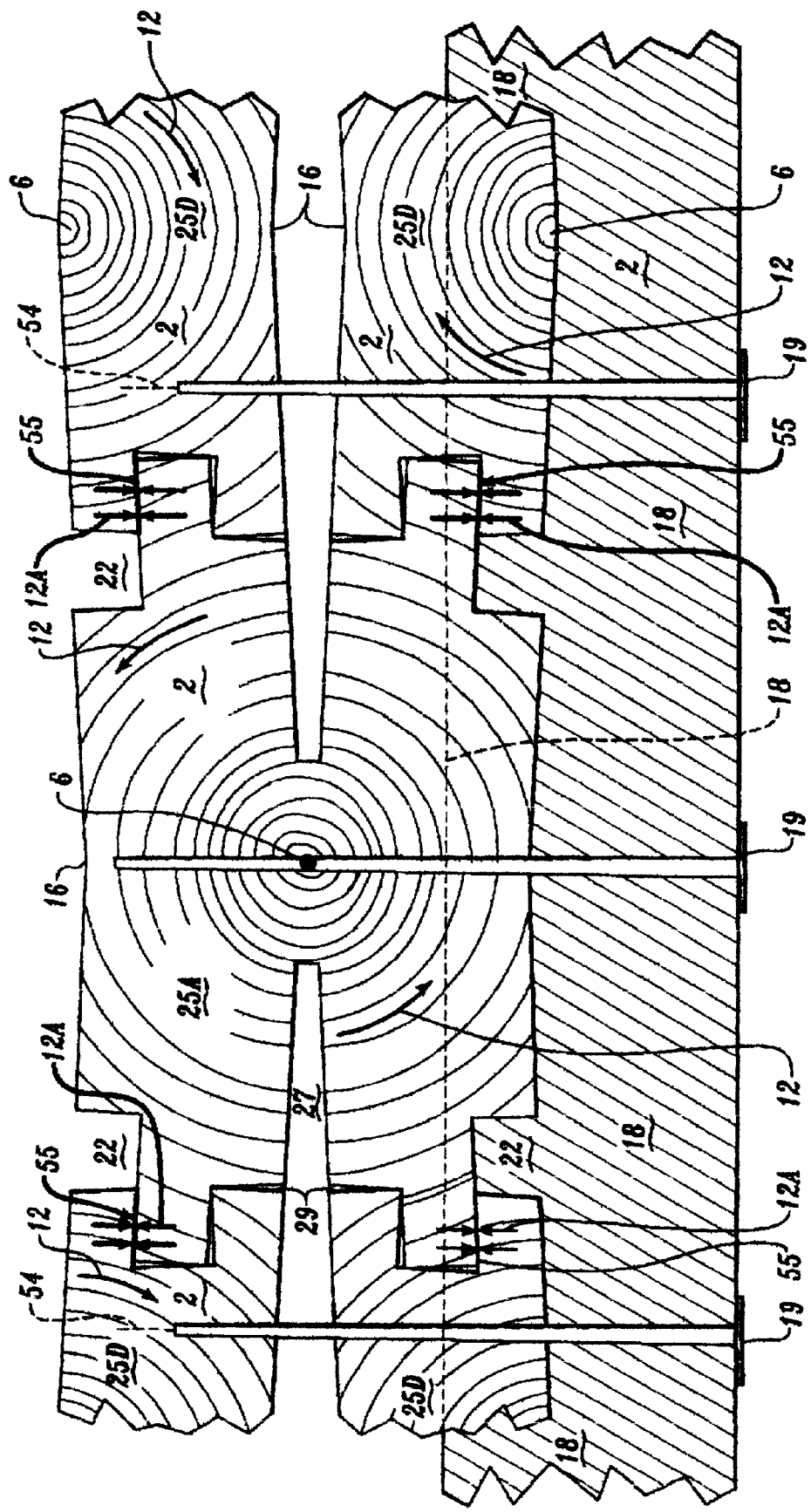
FIG. 27 illustrates in double scale a part of the panel shown in FIG. 26.

FIG. 27—Is part of FIG. 26 but in double scale to show the finer details of the air-tight joint system. 16 indicates cupping; 55 shows the pressure points where the tongue and grooves are almost crushed together stopping any possible passage of water or air through the joint; 29 shows spaces formed between the individual planks when they radially shrink on their nails; 27 shows how the saw slits open up because of tangential movement; 25a are individual dry planks. They are individual because each is individually hung at its center to the cross batten (18) and are free to expand with moisture and contract again in dry weather. The tongues will slide in the grooves at the pressure points 55 without losing the air-tight seal between the planks, when the planks expand or contract with moisture. 12 and 12A indicates the tangential movement of the wood as it dries and also shows opposing forces causing the tight joints.

Figure 28:
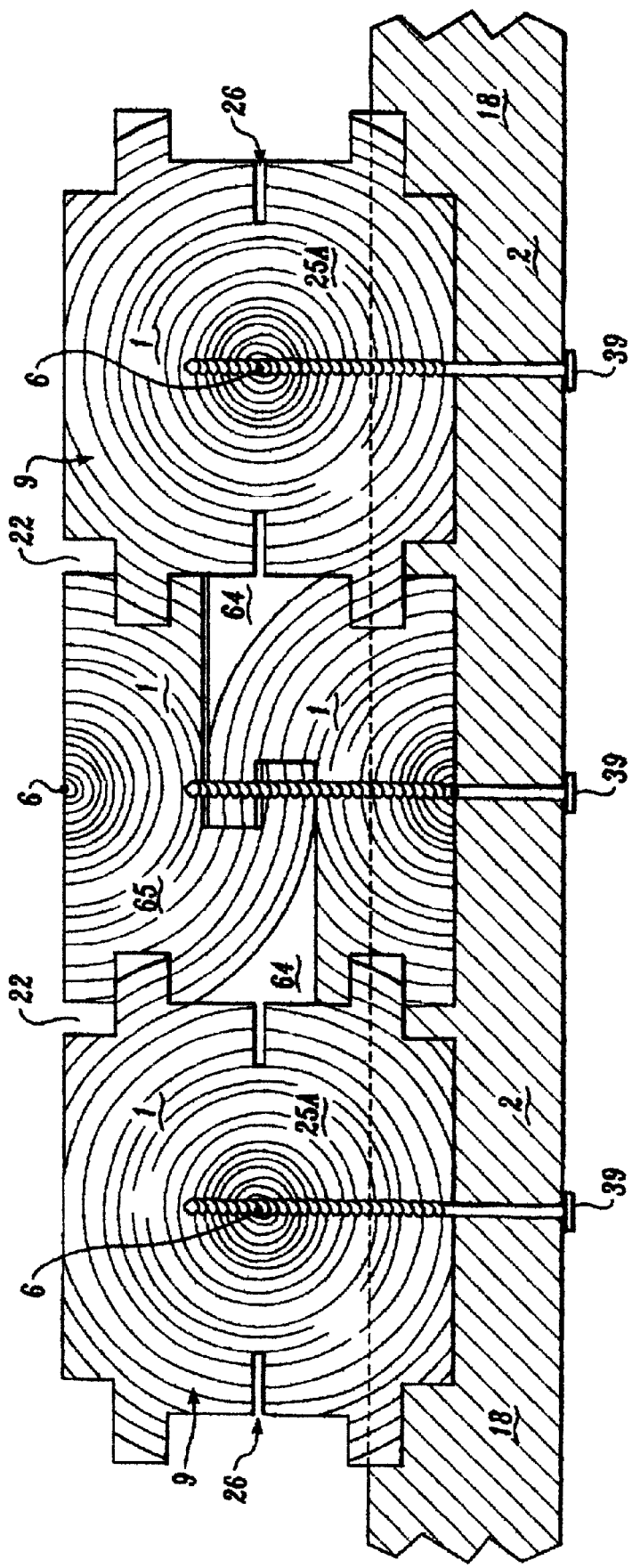
FIG. 28 shows a panel made from green 4 inch logs. The right side logs is similar to the 3 inch log in FIG. 25 and is tied to a cross tie as in FIG. 25. The center green 4 inch log has been split into two halves and instead of being formed into two planks with grooves on each end as in FIG. 25 hook like appendages have been machined out of the rounded side of the half logs so that the two half logs can be physically locked and nailed together in the panel instead of relying on the nails only as in FIG. 25.
Figure 29:
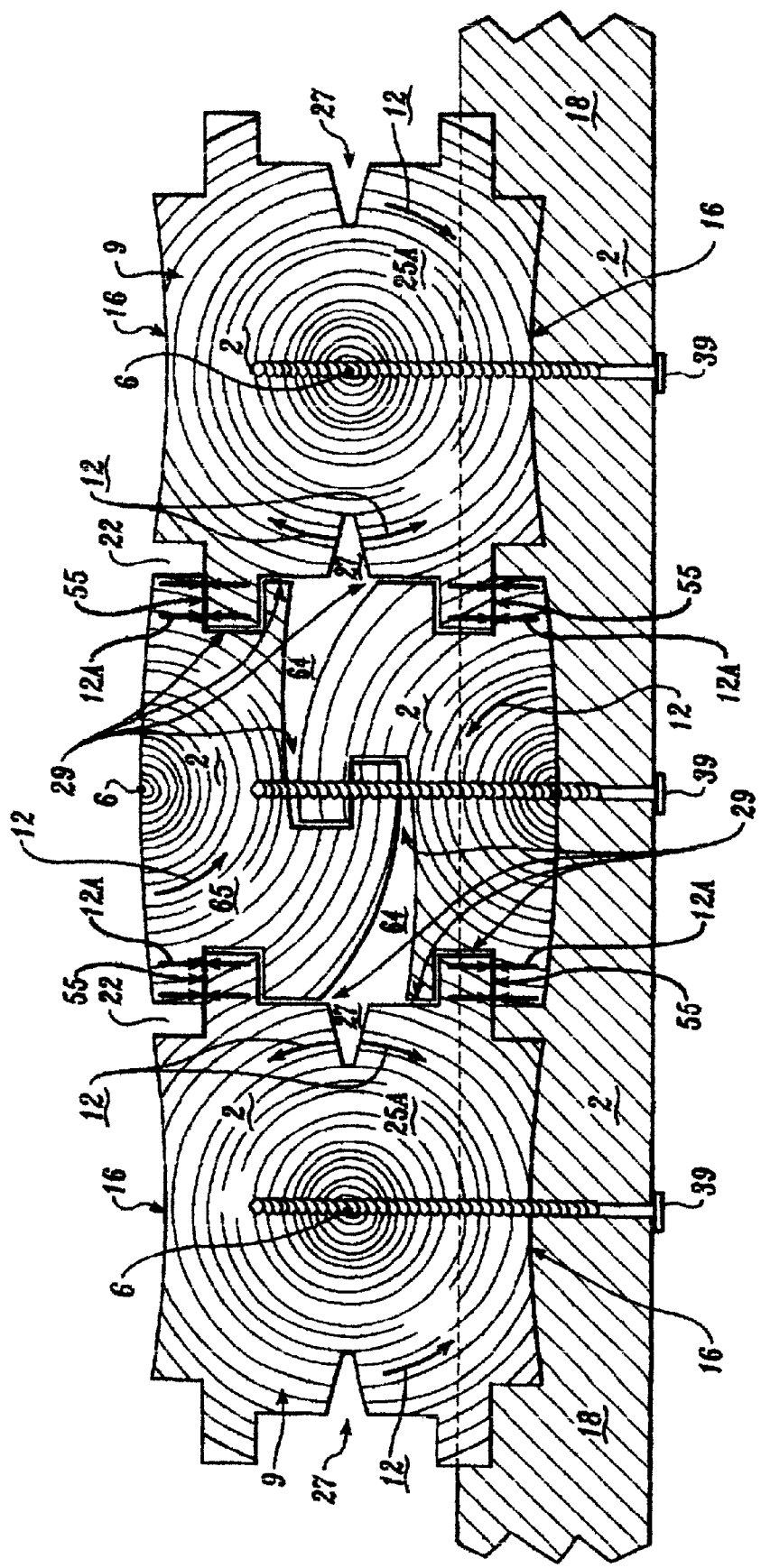
FIG. 29 is to FIG. 28 as FIG. 26 is to FIG. 25 except that the logs are made out of 4 inch logs instead of 3 inch logs and that the interlocking half logs in this figure makes for a stronger more solid panel. The logs in this figure are very dry.
Figure 30:
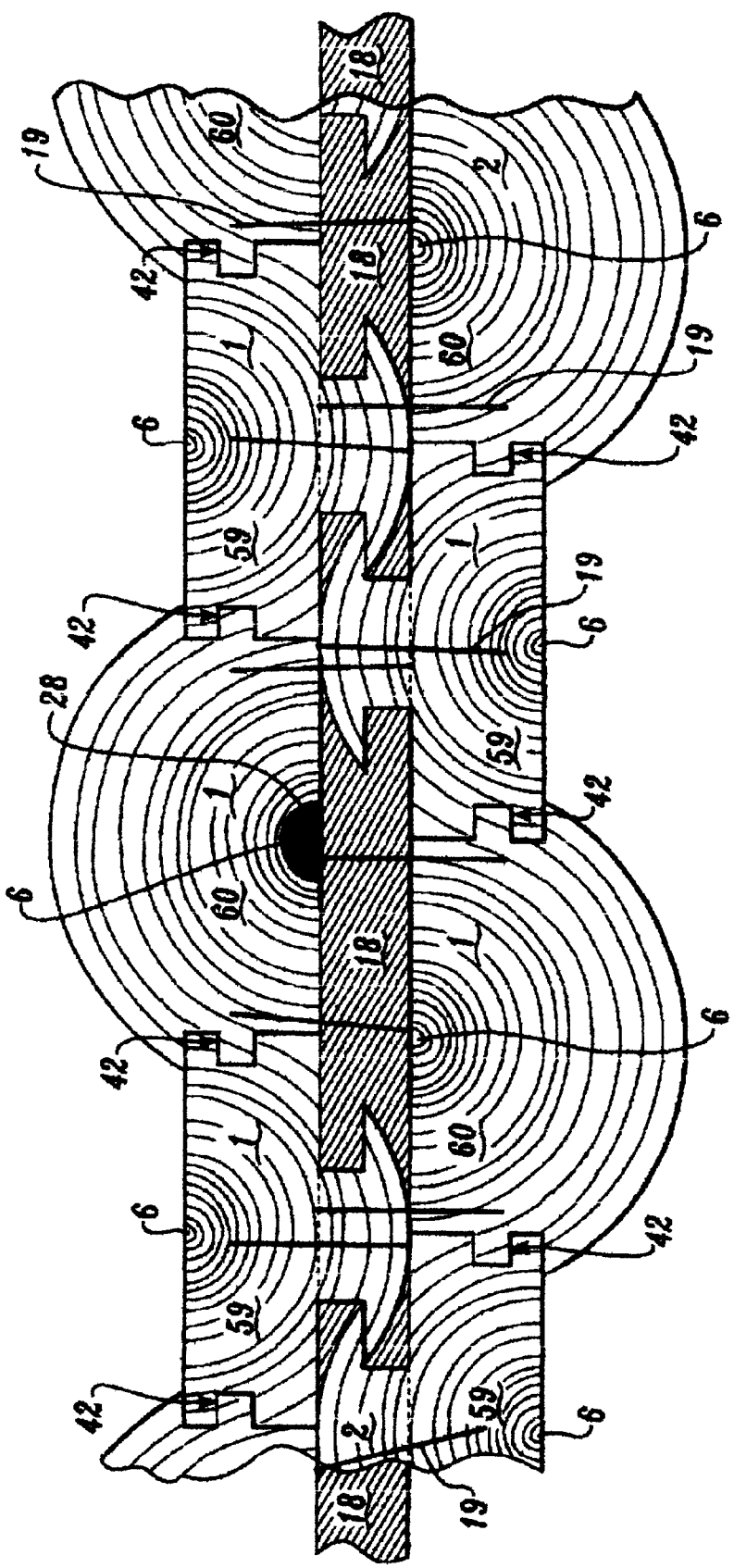
FIG. 30 is a composite two-layer panel composed of green half round planks and green Tee (T) shaped planks with hook shaped appendages interlocked and tied together by internally nailed cross ties. The ½ round planks and the tee planks alternate in each layer.

FIGS. 28 and 29 are an extension of FIGS. 25 and 26. Here the two "floating" pieces 65 are physically locked together as also shown in FIG. 29. In FIG. 25, the two "floating" pieces (25C) rely on nails to hold them in place so that the tongues of planks 25 can be forced by tangential shrinkage pressure to make a tight joint. This hold is more sure using the planks 65 shown in these illustrations. As in FIG. 30, the hooked appendage 65 in this drawing are like 59 in FIG. 30 in that they are machined out of the rounded part of the log that would otherwise be wasted. The main purpose of designs in FIGS. 25, 30 and 28 is to create a panel where the heart side of the components are alternated from one plank to the next so that tangential shrinkage will force the tongue and groove joints together, in a crushing action. Here again cross ties 18 are used to anchor the components to the same bearing to aid the crushing action in the tongue and groove joints, serve to resist sheer forces and to act to prevent settling if the timbers are horizontal as in a log house. The individual planks will shrink onto their screws from radial shrinkage and the tongues will slide out of the grooves slightly, 29, but they are too deep to slide out of the grooves altogether. In FIG. 28, 25A are green timbers that have the heart of the logs they were machined from close to the center of the timber. At 26 there are saw slits cut to avoid checks and cracks from forming. Timber 25A is tied tightly to the cross tie 18 by wood screws 39. There are two interlocked planks 65, which for the purpose of this invention are set with their hearts out so that tangential shrinkage will force them against the tongues of the 25A planks on each side. 22 are grooves that help disguise shrinkage. 64 are voids formed between the round surface of one plank 65 and the flat surface of the interlocked plank 65. 39 are the connecting screws.

FIG. 29 shows what happens to FIG. 28 when it is thoroughly dried out. Tangential shrinkage (arrows 12 and 12A) open up the saw slits 26 in FIG. 28 to become open vees 27, in FIG. 29 forcing the tongues away from the vees 27 and crushing them against the side of the grooves in planks 65 at 55. Planks 65 have cupped away from their hearts as occurs with tangential shrinkage and are directly thrust against the tongues of the 25A planks. This crushing action is in collision so there is no possible space left between the tongues of planks 25A and the outside of the grooves of the planks 65 making a very waterproof and airtight joint. The screws 39 keep the planks 25A and 65 in relatively the same position as in FIG. 28 only the tongues and grooves move together. The crushing action is shown by arrows 12A and the crushed area is 55. 29 are spaces formed between the components caused by radial shrinkage—the components became smaller but as they are hung on screws 39, spaces open between them.

Figure 31:
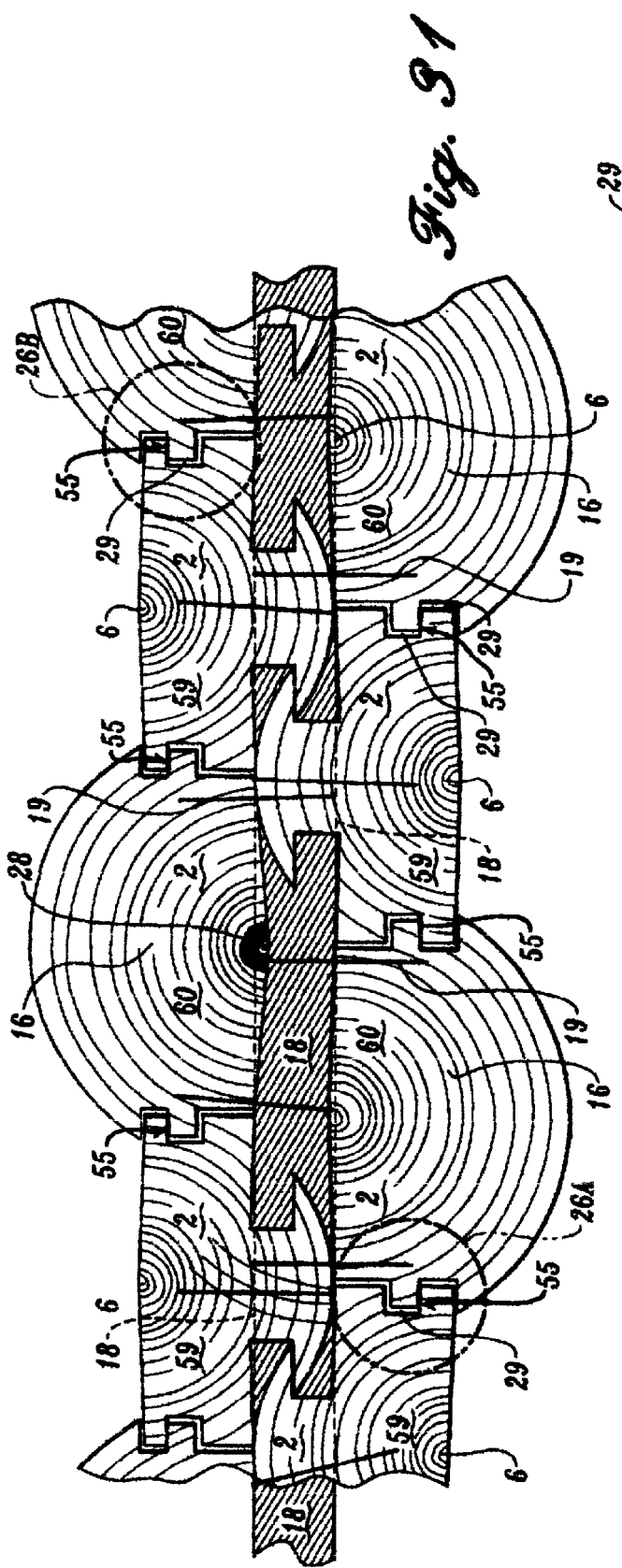
FIG. 31 shows what happens to the panel in FIG. 30 when it dries.
Figure 33:
FIGS. 32 and 33 in double scale show the effect of shrinking on two of the tongue and groove connections in FIG. 31.
Figure 32:

FIGS. 30, 31, 32 and 33 cover a variation of a wood wall introduced in my patent application Ser. No. 08/640,181 filed Apr. 30, 1996 and abandoned when it was divided into three divisional applications dated Sep. 28, 1998. This is a more complicated wall system, but contains all the elements of tangential shrinkage made use of in my previous figures in this application and each element has a heart of a log on one side. The elements are set so that heart sides of planks alternate from one plank to the other. This sets the tangential shrinkage of one plank in direct opposition to the tangential shrinkage of the next plank forming waterproof joints. This wall panel has a cross tie buried within it and all nails are internal and out of sight. 60 is a half log with a tongue on each edge and also has its heart showing. 59 is a similar half log having a groove on each edge, but it has a hook like appendage machined out of the curved log material shown in 60. This Tee shaped appendage is cross notched to receive the cross ties 18, which are nailed internally and alternatively to the half log shapes 59 and 60 on each side of 18. FIG. 30 features Greenwood 1. Half logs 60 with tongues on each side. Planks 59 have grooves on each edge and has the Tee shaped appendage. 42 indicates tight tongue and grooves between planks. 18 is the cross tie internally nailed to planks 59 and 60. 19 are internal nails, 6 are the hearts of logs. 2 indicates that the cross tie 18 is dry wood. 28 is a soft heart, which is turned inward and out of view. FIG. 31 is what FIG. 30 looks like when the planks are thoroughly dried out. Tangential shrinkage has forced the planks in each layer together and has caused the planks 59 to hook tightly together directly and internally tying one layer of the panel to the other supplementing the nails 19. There is double layer locking out of water and air. The tongue and grooves on each side and the hooking inside. The distortion is exaggerated and is actually hardly noticeable on a whole house wall, especially if the surfaces are rough finished. 26A and 26B are double enlargements of the tongue and groove joints on each side of the wall assembly. 12 indicate tangential shrinkage forcing the tongue of half log 60 against the inside of the groove of Tee shape 59 so that the wood is almost crushed at 55.

Figure 34:
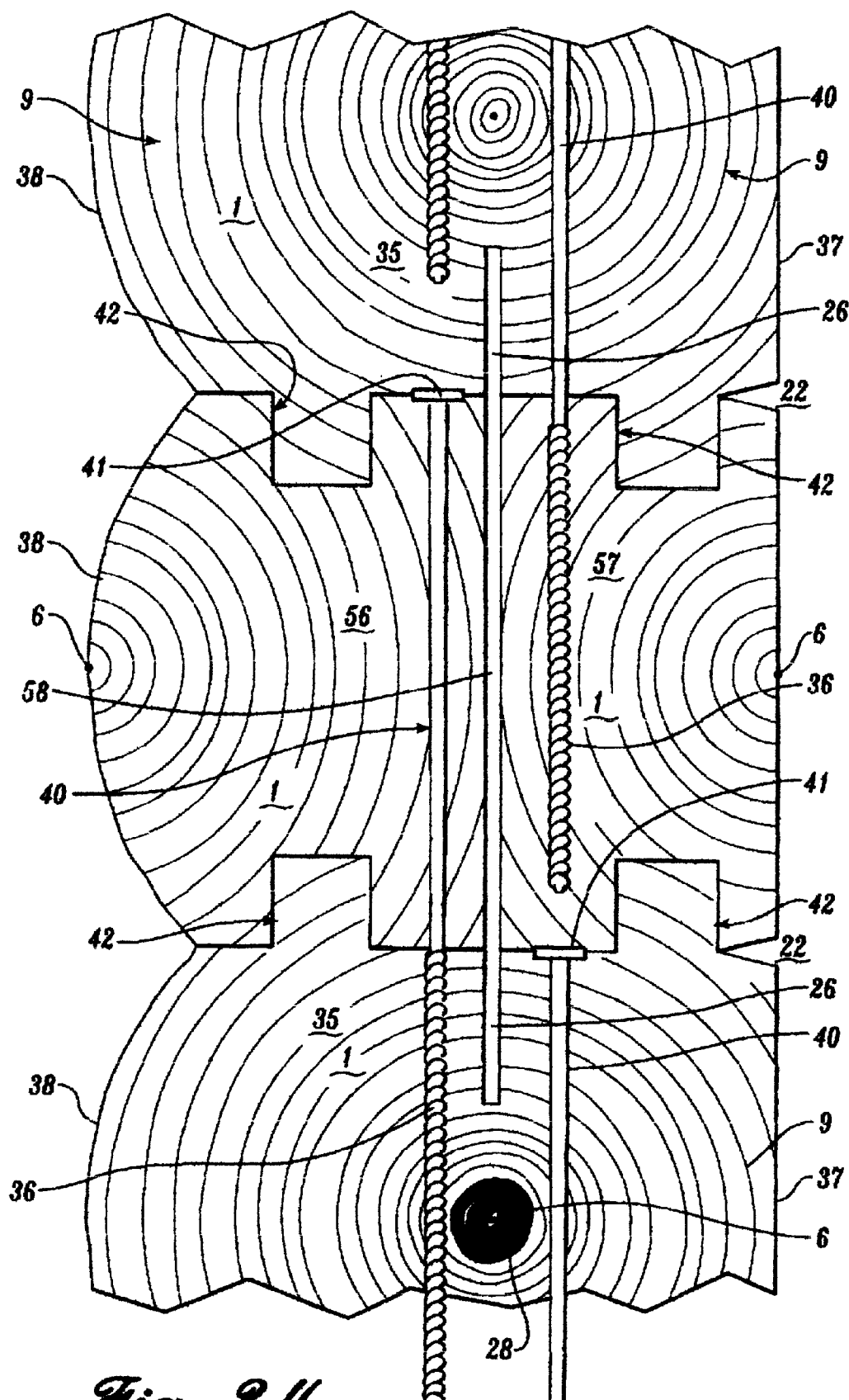
FIG. 34 shows a log wall made up of "D" logs and half logs in alternate tiers assembled similar to FIG. 25 except that screws act as cross ties. The Dee logs are approximately 6 inches by 6 inches and are greenwood attached together with screws.

FIG. 34 This log wall system begins as a wall made from green "Dee" logs except that every second tier is a split log with the hearts on the outside. The wall is stiffened against shear forces through the use of long screws which are only half threaded and can have drill like points that allow the screws to be power driven into the wood without the need to pre-drill holes. Though relatively new, the screws are broadly used. However, my invention introduces the use of the screws for the avoidance of the logs settling. My screws have wider heads then present screws to avoid crushing the wood above the screws. The threaded part of the screw is locked in place by shrinkage of the wood around the threaded portion so that it takes about 1700 lbs. of weight to push the screw further down once the wood starts shrinking. The screw heads virtually hold up the log above and all of the rest of the logs to the top of the wall. The "Dee" logs are approximately 6"×6" 35. 1. Is Greenwood, 6 indicates log hearts, 9 are growth rings. 26 are splitting relief saw slits. 40 are the special long screws. 36 is the thread part of the screw. 41 are the screw heads that support the logs above. 37 is the flat side of the "D" logs and 38 is the rounded side. 42 are the tight fitting tongue and grooves between logs. 56 is the rounded half log with its hearts being on the rounded part, 57 is the square log half. 58 is the space between the pair of half logs.

Figure 35:
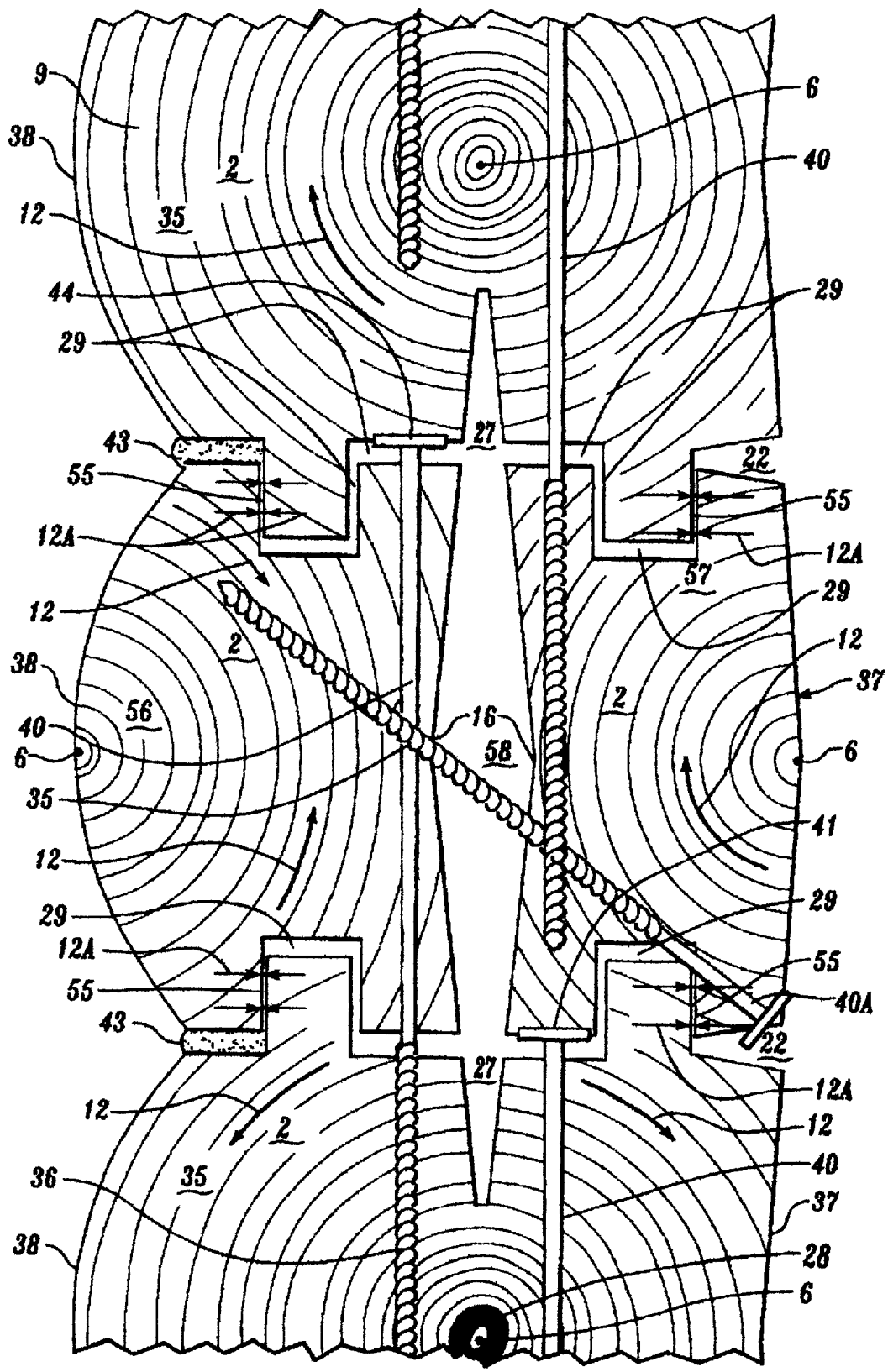
FIG. 35 shows the log wall in FIG. 34 a year after construction, considerable shrinkage and distortion has happened but no settling.

FIG. 35 This shows the log wall when it is dried out in about a year later than FIG. 34. The logs and half logs have shrunk but shrinkage has not accumulated to cause settlement of the logs. Each log is held up in its previous position perched on the top of the screw heads of the lag screws below it. The screws 40 have popped up, but the screw heads 41 are still in the same relation to the second log below that has locked onto the threaded part of the screw. Spaces 29 have appeared between the logs and caulking 43 is necessary to fill this space outside. Inside the special groove 22 disguises the extra shrinkage. In log house parlance the caulking may be called chinking. Tangential shrinkage forces the tongues very tightly to the side of the grooves to a point where the wood is nearly crushed making an air and watertight seal to what was already tight joints in the greenwood. The extreme pressure points are indicated by 55. 27 also indicates tangential shrinkage changing the saw slits into deep vee grooves. 37 indicates cupping on the flat side of the logs due to tangential shrinkage. The lag screws 40 give resistance to shear forces as well as limiting settlement and also tie the logs together. Sometimes the half logs tend to twist. Log screw 40A indicates how a twisting half log can be forced into a correct position. 12 indicates tangential shrinkage. 12A indicates how the different sides of the joint are crushed together by tangential shrinkage stopping all possible ingress of air or water.

Figure 36:
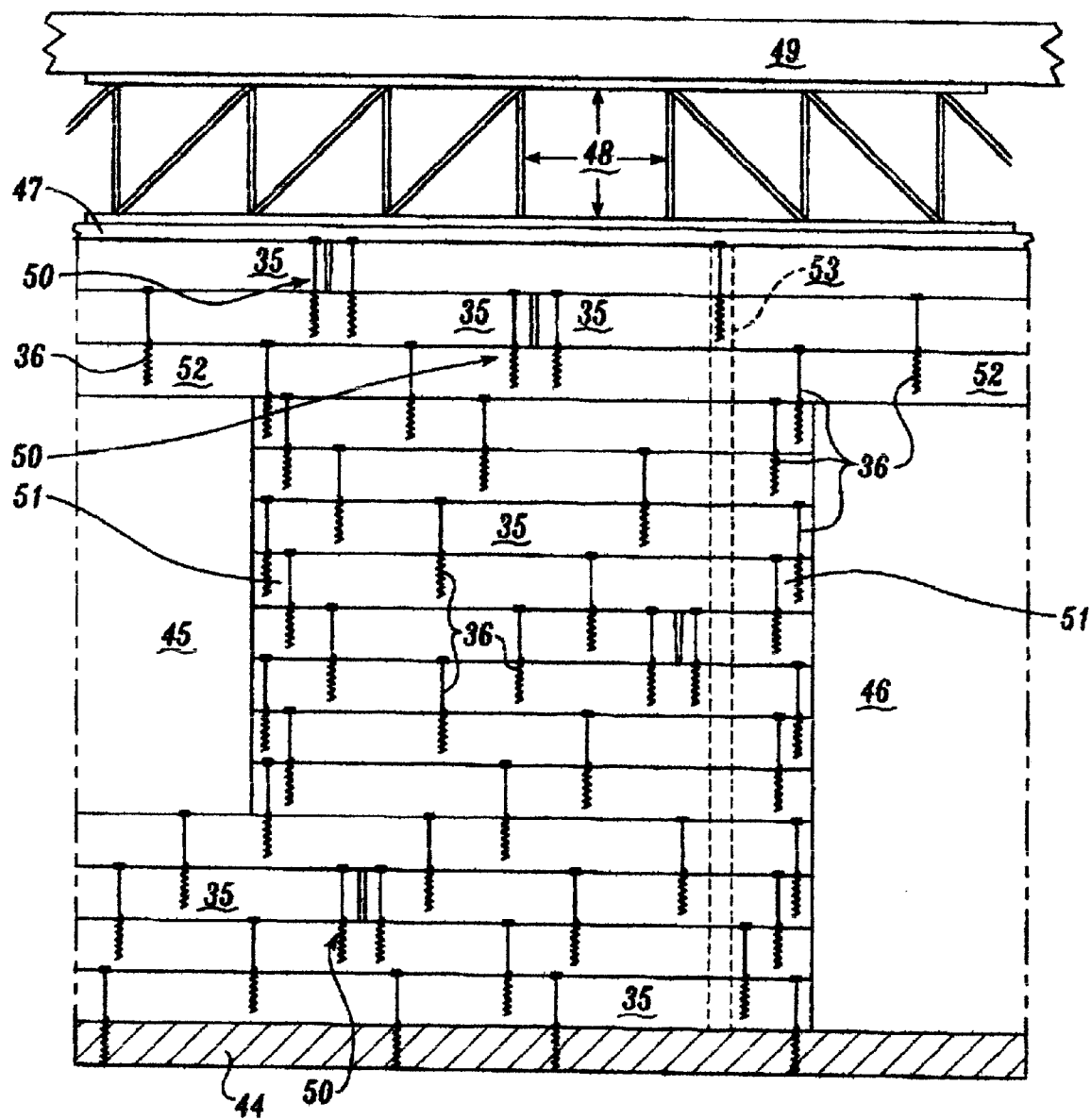
FIG. 36 shows an elevation view of a wall constructed out of the logs shown in FIG. 34. Included are floor platform, ceiling planks, top of the wall truss and roof platform. Also included in dotted lines is a post that supports the ceilings, the truss and roof. Openings for a door and a window are included. The drawing shows an x-ray view of the screws which are encased in the logs.

FIG. 36 This is an elevation view of a log wall plus the floor, ceiling and roof system including openings for a door and a window. The lag screws which are ordinarily buried out of view are shown in an ex-ray like situation. 44 is the floor platform on which the wall stands. 45 is an opening for a window and 46 is a door opening 35 are the "D" logs and 36 are the lag screws. 47 is the ceiling system. 48 is the truss which is supported by posts (53) and carries the roof and ceiling load. 49 is the roof construction. 50 shows how lag screws are set on each side of a splice joint between the ends of logs. 51 indicates double lag screws at the side of window and door openings. 52 and the logs above are effective door and window headers. There are no splices or joints in logs in the three courses of logs above openings. The drawing indicates more lag screws in the lower portion of the wall because these carry more weight whereas, for instance, the top log in any room carries practically no weight at all. The upper level here has a higher percentage of lag screws than is usual because of the splices. The post 53 carries the ceiling 47, truss 48 and roof 49 load so all that the screw heads and screw threads have to hold up are the logs above, there is no settling of the logs as the exact number of supporting screws are designed to carry the weight of the logs above so there are more screws designed for placement in the lower part of the wall than the upper; each screw can carry 1700 lbs.

What is claimed is:

1. A method of forming a watertight plank section, comprising the steps of:
   a) sawing green wood planks, including the heart of the log adjacent one side of the plank;
   b) machining some of the planks to include a groove on each edge;
   c) machining some of the planks to include a tongue on each edge;
   d) cutting cross grooves in one side of each plank, with the cross grooves being on the heart side of planks with two tongues and/or the opposite side of plank with two grooves;
   e) fabricating a section, placing a plurality of planks on a surface, heart's alternating, tongue to groove with the cross grooves facing upwardly;
   f) clamping the planks forcing adjacent tongues and grooves to mate;
   g) securing the planks by fastening dry wood cross ties in each of the cross grooves; and
   h) drying the section forcing the tongues against one side of the groove forming a watertight seal.

2. A method as in claim 1, wherein the tongue is cut with uneven shoulders.

3. A method as in claim 1, wherein the planks include two tongues or two grooves on each edge.

* * * * *